US012609094B2

(12) United States Patent
Meng et al.

(10) Patent No.: US 12,609,094 B2
(45) Date of Patent: Apr. 21, 2026

(54) FOVEATED IMAGING BASED ON REGIONS OF INTEREST

(71) Applicant: QUALCOMM Incorporated, San Diego, CA (US)

(72) Inventors: Hao Meng, San Diego, CA (US); Lukai Cai, San Diego, CA (US); Zhen Liu, San Diego, CA (US); Pawan Kumar Baheti, Bangalore (IN); Simon Peter William Booth, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/781,894

(22) Filed: Jul. 23, 2024

(65) Prior Publication Data

US 2026/0031065 A1     Jan. 29, 2026

(51) Int. Cl.
| | |
|---|---|
| *H04N 23/68* | (2023.01) |
| *G02B 27/00* | (2006.01) |
| *G02B 27/01* | (2006.01) |
| *G06F 3/01* | (2006.01) |
| *G06V 10/25* | (2022.01) |
| *G09G 5/391* | (2006.01) |
| *H04N 5/262* | (2006.01) |

(52) U.S. Cl.
CPC ......... *G09G 5/391* (2013.01); *G02B 27/0093* (2013.01); *G02B 27/0172* (2013.01); *G06F 3/013* (2013.01); *G06V 10/25* (2022.01); *G02B 2027/0138* (2013.01); *G09G 2340/0407* (2013.01)

(58) Field of Classification Search
CPC ...................................................... G06F 3/013
See application file for complete search history.

(56) References Cited

U.S. PATENT DOCUMENTS

| | | | |
|---|---|---|---|
| 11,379,952 B1 | 7/2022 | Sharma et al. | |
| 2014/0040285 A1* | 2/2014 | Rubinstein ............. | G06Q 50/01 |
| | | | 707/751 |

(Continued)

FOREIGN PATENT DOCUMENTS

| | | |
|---|---|---|
| WO | 2023163799 | 8/2023 |

OTHER PUBLICATIONS

International Search Report and Written Opinion—PCT/US2025/031937—ISA/EPO—Oct. 7, 2025.

*Primary Examiner* — Nan-Ying Yang
(74) *Attorney, Agent, or Firm* — Polsinelli LLP/QUALCOMM Incorporated

(57) ABSTRACT

Systems and techniques are described herein for displaying images. For instance, a method for displaying images is provided. The method may include obtaining image data for display at a display of a head-mounted device (HMD); determining a content-based region of interest (ROI) within the image data based on content of the image data; determining a gaze-based ROI of the image data based on gaze information; displaying, at the display, content-based-ROI image data of the content-based ROI at a first resolution; displaying, at the display, gaze-based ROI image data of the gaze-based ROI at a second resolution; and displaying, at the display, peripheral image data outside the content-based ROI and outside the ROI at a third resolution.

20 Claims, 11 Drawing Sheets

(56)        References Cited

U.S. PATENT DOCUMENTS

| | | | |
|---|---|---|---|
| 2018/0098059 A1* | 4/2018 | Valdivia | G06F 3/0481 |
| 2018/0196512 A1* | 7/2018 | Kim | G06F 1/1637 |
| 2019/0196576 A1* | 6/2019 | Saarinen | G06V 20/20 |
| 2019/0221044 A1 | 7/2019 | Motta et al. | |
| 2019/0273910 A1 | 9/2019 | Malaika | |
| 2019/0384381 A1 | 12/2019 | Stafford et al. | |
| 2021/0035264 A1 | 2/2021 | Li et al. | |
| 2021/0099632 A1 | 4/2021 | Molholm | |
| 2023/0079929 A1 | 3/2023 | Bradski et al. | |
| 2023/0232103 A1* | 7/2023 | Kobayashi | H04N 13/344 |
| | | | 348/158 |
| 2024/0036640 A1 | 2/2024 | Zhang et al. | |
| 2024/0196065 A1* | 6/2024 | Hamada | G06V 10/761 |

* cited by examiner

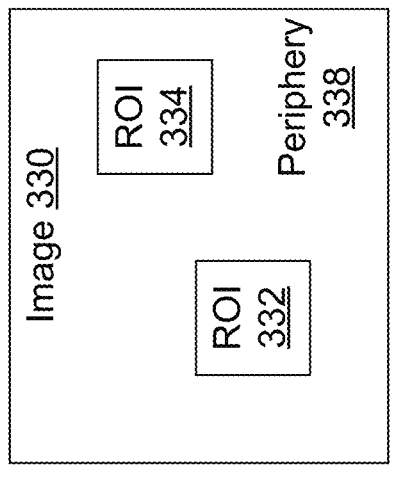
FIG. 3C
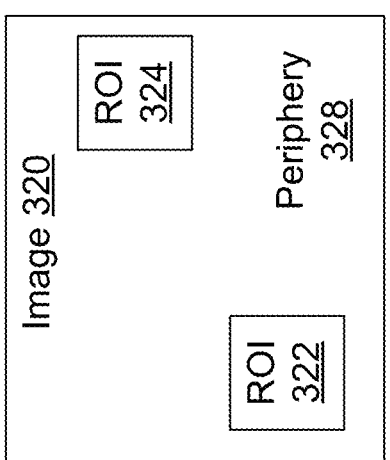
FIG. 3B
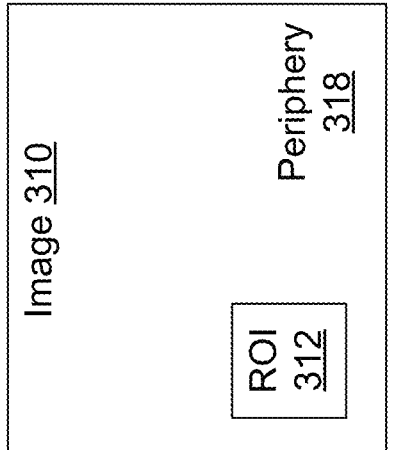
FIG. 3A
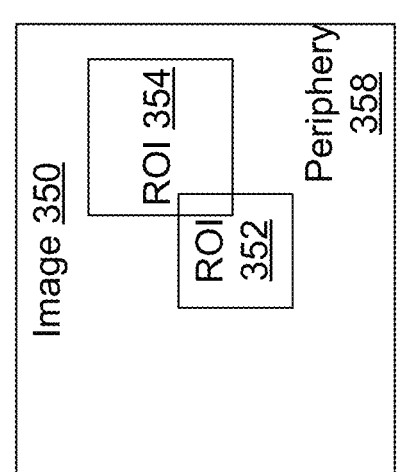
FIG. 3F
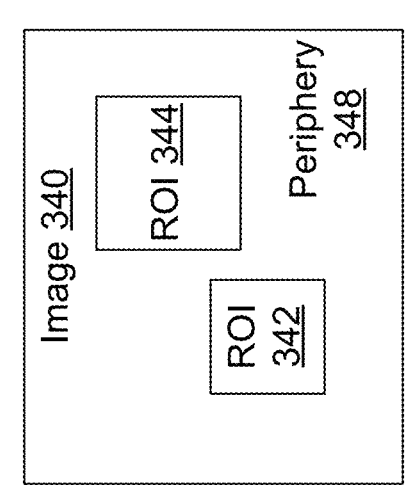
FIG. 3E
FIG. 3D

Figure 6:
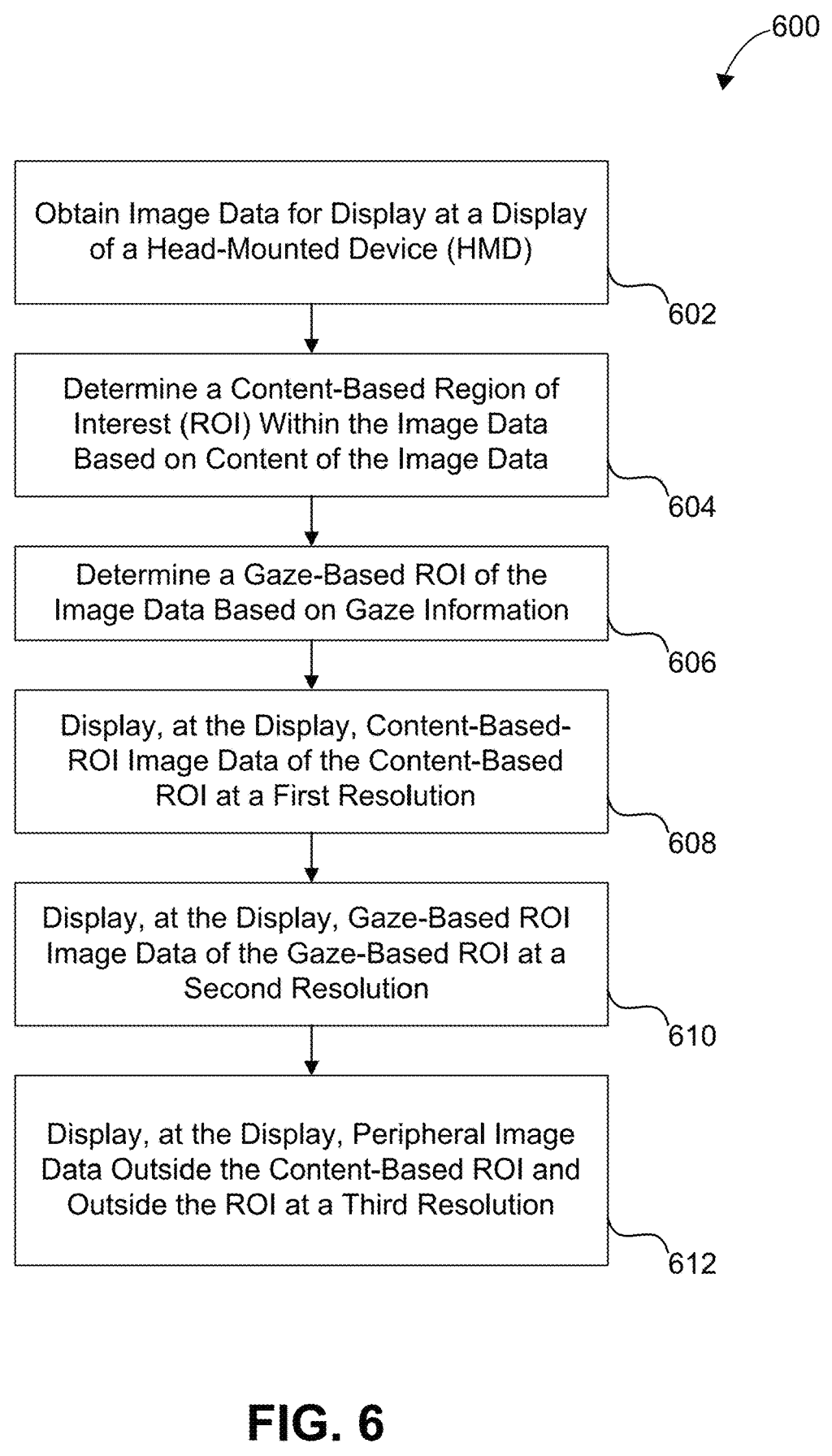

600

Obtain Image Data for Display at a Display
of a Head-Mounted Device (HMD)

602

Determine a Content-Based Region of
Interest (ROI) Within the Image Data
Based on Content of the Image Data

604

Determine a Gaze-Based ROI of the
Image Data Based on Gaze Information

606

Display, at the Display, Content-Based-
ROI Image Data of the Content-Based
ROI at a First Resolution

608

Display, at the Display, Gaze-Based ROI
Image Data of the Gaze-Based ROI at a
Second Resolution

610

Display, at the Display, Peripheral Image
Data Outside the Content-Based ROI and
Outside the ROI at a Third Resolution

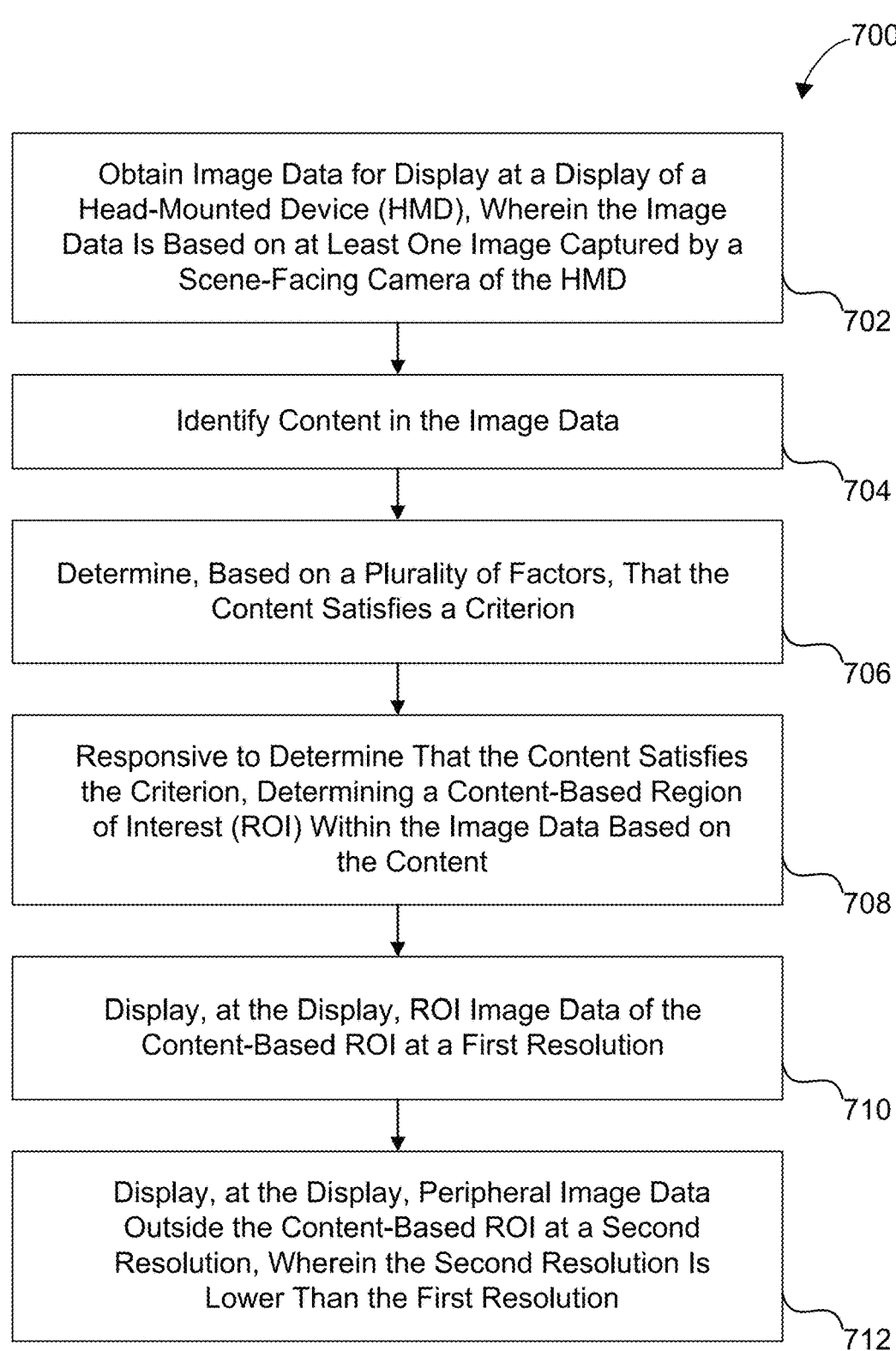

700

Obtain Image Data for Display at a Display of a Head-Mounted Device (HMD), Wherein the Image Data Is Based on at Least One Image Captured by a Scene-Facing Camera of the HMD

702

Identify Content in the Image Data

704

Determine, Based on a Plurality of Factors, That the Content Satisfies a Criterion

706

Responsive to Determine That the Content Satisfies the Criterion, Determining a Content-Based Region of Interest (ROI) Within the Image Data Based on the Content

708

Display, at the Display, ROI Image Data of the Content-Based ROI at a First Resolution

710

Display, at the Display, Peripheral Image Data Outside the Content-Based ROI at a Second Resolution, Wherein the Second Resolution Is Lower Than the First Resolution

FOVEATED IMAGING BASED ON REGIONS OF INTEREST

TECHNICAL FIELD

The present disclosure generally relates to imaging. For example, aspects of the present disclosure include systems and techniques for performing foveated imaging based on one or more regions of interest.

BACKGROUND

Extended reality (XR) technologies can be used to present virtual content to users, and/or can combine real environments from the physical world and virtual environments to provide users with XR experiences. The term XR can encompass virtual reality (VR), augmented reality (AR), mixed reality (MR), and the like. XR systems can allow users to experience XR environments by overlaying virtual content onto a user's view of a real-world environment. For example, an XR head-mounted device (HMD) may include a display that allows a user to view the user's real-world environment through a display of the HMD (e.g., a transparent display). The XR HMD may display virtual content at the display in the user's field of view overlaying the user's view of their real-world environment. Such an implementation may be referred to as "see-through" XR. As another example, an XR HMD may include a scene-facing camera that may capture images of the user's real-world environment. The XR HMD may modify or augment the images (e.g., adding virtual content) and display the modified images to the user. Such an implementation may be referred to as "pass through" XR or as "video see through (VST)." The user can generally change their view of the environment interactively, for example by tilting or moving the XR HMD.

A foveated image is an image with different resolutions in different regions within the image. For example, a foveated image may include a highest resolution in a region of interest (ROI) and one or more lower-resolution regions around the ROI (e.g., in one or more "peripheral regions").

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described for displaying images. According to at least one example, a method is provided for displaying images. The method includes: obtaining image data for display at a display of a head-mounted device (HMD); determining a content-based region of interest (ROI) within the image data based on content of the image data; determining a gaze-based ROI of the image data based on gaze information; displaying, at the display, content-based-ROI image data of the content-based ROI at a first resolution; displaying, at the display, gaze-based ROI image data of the gaze-based ROI at a second resolution; and displaying, at the display, peripheral image data outside the content-based ROI and outside the ROI at a third resolution.

In another example, an apparatus for displaying images is provided that includes at least one memory and at least one processor (e.g., configured in circuitry) coupled to the at least one memory. The at least one processor configured to: obtain image data for display at a display of a head-mounted device (HMD); determine a content-based region of interest (ROI) within the image data based on content of the image data; determine a gaze-based ROI of the image data based on gaze information; display, at the display, content-based-ROI image data of the content-based ROI at a first resolution; display, at the display, gaze-based ROI image data of the gaze-based ROI at a second resolution; and display, at the display, peripheral image data outside the content-based ROI and outside the ROI at a third resolution.

In another example, a non-transitory computer-readable medium is provided that has stored thereon instructions that, when executed by one or more processors, cause the one or more processors to: obtain image data for display at a display of a head-mounted device (HMD); determine a content-based region of interest (ROI) within the image data based on content of the image data; determine a gaze-based ROI of the image data based on gaze information; display, at the display, content-based-ROI image data of the content-based ROI at a first resolution; display, at the display, gaze-based ROI image data of the gaze-based ROI at a second resolution; and display, at the display, peripheral image data outside the content-based ROI and outside the ROI at a third resolution.

In another example, an apparatus for displaying images is provided. The apparatus includes: means for obtaining image data for display at a display of a head-mounted device (HMD); means for determining a content-based region of interest (ROI) within the image data based on content of the image data; means for determining a gaze-based ROI of the image data based on gaze information; means for displaying, at the display, content-based-ROI image data of the content-based ROI at a first resolution; means for displaying, at the display, gaze-based ROI image data of the gaze-based ROI at a second resolution; and means for displaying, at the display, peripheral image data outside the content-based ROI and outside the ROI at a third resolution.

In another example, a method is provided for displaying images. The method includes: obtaining image data for display at a display of a head-mounted device (HMD), wherein the image data is based on at least one image captured by a scene-facing camera of the HMD; identifying content in the image data; determining, based on a plurality of factors, that the content satisfies a criterion; responsive to determining that the content satisfies the criterion, determining a content-based region of interest (ROI) within the image data based on the content; displaying, at the display, ROI image data of the content-based ROI at a first resolution; and displaying, at the display, peripheral image data outside the content-based ROI at a second resolution, wherein the second resolution is lower than the first resolution.

In another example, an apparatus for displaying images is provided that includes at least one memory and at least one processor (e.g., configured in circuitry) coupled to the at least one memory. The at least one processor configured to: obtain image data for display at a display of a head-mounted device (HMD), wherein the image data is based on at least one image captured by a scene-facing camera of the HMD; identify content in the image data; determine, based on a plurality of factors, that the content satisfies a criterion;

responsive to determining that the content satisfies the criterion, determine a content-based region of interest (ROI) within the image data based on the content; display, at the display, ROI image data of the content-based ROI at a first resolution; and display, at the display, peripheral image data outside the content-based ROI at a second resolution, wherein the second resolution is lower than the first resolution.

In another example, a non-transitory computer-readable medium is provided that has stored thereon instructions that, when executed by one or more processors, cause the one or more processors to: obtain image data for display at a display of a head-mounted device (HMD), wherein the image data is based on at least one image captured by a scene-facing camera of the HMD; identify content in the image data; determine, based on a plurality of factors, that the content satisfies a criterion; responsive to determining that the content satisfies the criterion, determine a content-based region of interest (ROI) within the image data based on the content; display, at the display, ROI image data of the content-based ROI at a first resolution; and display, at the display, peripheral image data outside the content-based ROI at a second resolution, wherein the second resolution is lower than the first resolution.

In another example, an apparatus for displaying images is provided. The apparatus includes: means for obtaining image data for display at a display of a head-mounted device (HMD), wherein the image data is based on at least one image captured by a scene-facing camera of the HMD; means for identifying content in the image data; means for determining, based on a plurality of factors, that the content satisfies a criterion; means for responsive to determining that the content satisfies the criterion, determining a content-based region of interest (ROI) within the image data based on the content; means for displaying, at the display, ROI image data of the content-based ROI at a first resolution; and means for displaying, at the display, peripheral image data outside the content-based ROI at a second resolution, wherein the second resolution is lower than the first resolution.

In some aspects, one or more of the apparatuses described herein is, can be part of, or can include an extended reality device (e.g., a virtual reality (VR) device, an augmented reality (AR) device, or a mixed reality (MR) device), a vehicle (or a computing device, system, or component of a vehicle), a mobile device (e.g., a mobile telephone or so-called "smart phone", a tablet computer, or other type of mobile device), a smart or connected device (e.g., an Internet-of-Things (IOT) device), a wearable device, a personal computer, a laptop computer, a video server, a television (e.g., a network-connected television), a robotics device or system, or other device. In some aspects, each apparatus can include an image sensor (e.g., a camera) or multiple image sensors (e.g., multiple cameras) for capturing one or more images. In some aspects, each apparatus can include one or more displays for displaying one or more images, notifications, and/or other displayable data. In some aspects, each apparatus can include one or more speakers, one or more light-emitting devices, and/or one or more microphones. In some aspects, each apparatus can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures:

FIG. 3A through FIG. 3F include respective example images, including ROIs, which may be determined and/or displayed by the example system of FIG. 2, according to various aspects of the present disclosure;

FIG. 6 is a flow diagram illustrating an example process for displaying images, in accordance with aspects of the present disclosure;

FIG. 7 is a flow diagram illustrating another example process for displaying images, in accordance with aspects of the present disclosure;

DETAILED DESCRIPTION

Figure 1:
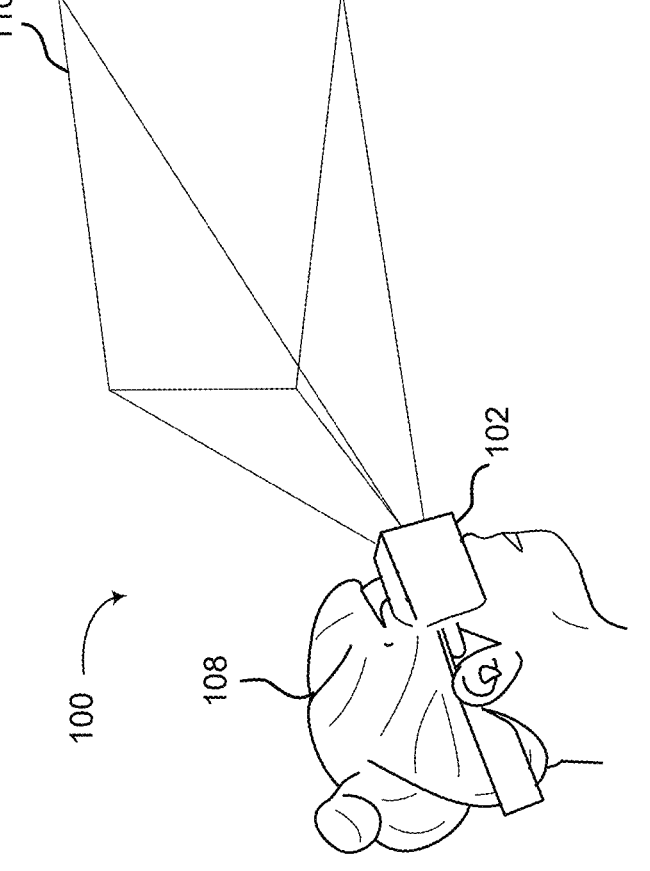
FIG. 1 is a diagram illustrating an example extended-reality (XR) system, according to aspects of the disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

As noted previously, an extended reality (XR) system or device can provide a user with an XR experience by presenting virtual content to the user (e.g., for a completely immersive experience) and/or can combine a view of a real-world or physical environment with a display of a virtual environment (made up of virtual content). The real-world environment can include real-world objects (also referred to as physical objects), such as people, vehicles, buildings, tables, chairs, and/or other real-world or physical objects. As used herein, the terms XR system and XR device are used interchangeably. Examples of XR systems or devices include head-mounted displays (HMDs) (which may also be referred to as a head-mounted devices), XR glasses (e.g., AR glasses, MR glasses, etc.) (also referred to as smart or network-connected glasses), among others. In some cases, XR glasses are an example of an HMD. In some cases, an XR system can track parts of the user (e.g., a hand and/or fingertips of a user) to allow the user to interact with items of virtual content.

XR systems can include virtual reality (VR) systems facilitating interactions with VR environments, augmented reality (AR) systems facilitating interactions with AR environments, mixed reality (MR) systems facilitating interactions with MR environments, and/or other XR systems.

For instance, VR provides a complete immersive experience in a three-dimensional (3D) computer-generated VR environment or video depicting a virtual version of a real-world environment. VR content can include VR video in some cases, which can be captured and rendered at very high quality, potentially providing a truly immersive virtual reality experience. Virtual reality applications can include gaming, training, education, sports video, online shopping, among others. VR content can be rendered and displayed using a VR system or device, such as a VR HMD or other VR headset, which fully covers a user's eyes during a VR experience.

AR is a technology that provides virtual or computer-generated content (referred to as AR content) over the user's view of a physical, real-world scene or environment. AR content can include virtual content, such as video, images, graphic content, location data (e.g., global positioning system (GPS) data or other location data), sounds, any combination thereof, and/or other augmented content. An AR system or device is designed to enhance (or augment), rather than to replace, a person's current perception of reality. For example, a user can see a real stationary or moving physical object through an AR device display, but the user's visual perception of the physical object may be augmented or enhanced by a virtual image of that object (e.g., a real-world car replaced by a virtual image of a DeLorean), by AR content added to the physical object (e.g., virtual wings added to a live animal), by AR content displayed relative to the physical object (e.g., informational virtual content displayed near a sign on a building, a virtual coffee cup virtually anchored to (e.g., placed on top of) a real-world table in one or more images, etc.), and/or by displaying other types of AR content. Various types of AR systems can be used for gaming, entertainment, and/or other applications.

MR technologies can combine aspects of VR and AR to provide an immersive experience for a user. For example, in an MR environment, real-world and computer-generated objects can interact (e.g., a real person can interact with a virtual person as if the virtual person were a real person).

An XR environment can be interacted with in a seemingly real or physical way. As a user experiencing an XR environment (e.g., an immersive VR environment) moves in the real world, rendered virtual content (e.g., images rendered in a virtual environment in a VR experience) also changes, giving the user the perception that the user is moving within the XR environment. For example, a user can turn left or right, look up or down, and/or move forwards or backwards, thus changing the user's point of view of the XR environment. The XR content presented to the user can change accordingly, so that the user's experience in the XR environment is as seamless as it would be in the real world.

In some cases, an XR system can match the relative pose and movement of objects and devices in the physical world. For example, an XR system can use tracking information to calculate the relative pose of devices, objects, and/or features of the real-world environment in order to match the relative position and movement of the devices, objects, and/or the real-world environment. In some examples, the XR system can use the pose and movement of one or more devices, objects, and/or the real-world environment to render content relative to the real-world environment in a convincing manner. The relative pose information can be used to match virtual content with the user's perceived motion and the spatio-temporal state of the devices, objects, and real-world environment. In some cases, an XR system can track parts of the user (e.g., a hand and/or fingertips of a user) to allow the user to interact with items of virtual content.

XR systems or devices can facilitate interaction with different types of XR environments (e.g., a user can use an XR system or device to interact with an XR environment). One example of an XR environment is a metaverse virtual environment. A user may virtually interact with other users (e.g., in a social setting, in a virtual meeting, etc.), virtually shop for items (e.g., goods, services, property, etc.), to play computer games, and/or to experience other services in a metaverse virtual environment. In one illustrative example, an XR system may provide a 3D collaborative virtual environment for a group of users. The users may interact with one another via virtual representations of the users in the virtual environment. The users may visually, audibly, haptically, or otherwise experience the virtual environment while interacting with virtual representations of the other users.

A virtual representation of a user may be used to represent the user in a virtual environment. A virtual representation of a user is also referred to herein as an avatar. An avatar representing a user may mimic an appearance, movement, mannerisms, and/or other features of the user. In some examples, the user may desire that the avatar representing the person in the virtual environment appear as a digital twin of the user. In any virtual environment, it is important for an XR system to efficiently generate high-quality avatars (e.g., realistically representing the appearance, movement, etc. of the person) in a low-latency manner. It can also be important for the XR system to render audio in an effective manner to enhance the XR experience.

In some cases, an XR system can include an optical "see-through" or "pass-through" display (e.g., see-through or pass-through AR HMD or AR glasses), allowing the XR system to display XR content (e.g., AR content) directly onto a real-world view without displaying video content. For example, a user may view physical objects through a display (e.g., glasses or lenses), and the AR system can display AR content onto the display to provide the user with an enhanced visual perception of one or more real-world objects. In one example, a display of an optical see-through AR system can include a lens or glass in front of each eye (or a single lens or glass over both eyes). The see-through display can allow the user to see a real-world or physical object directly, and can display (e.g., projected or otherwise displayed) an enhanced image of that object or additional AR content to augment the user's visual perception of the real world.

As noted previously, a foveated image may have different resolutions in different regions within the image. For example, a foveated image may include a highest resolution in a region of interest (ROI) and one or more lower-resolution regions around the ROI (e.g., in one or more "peripheral regions").

A foveated-image sensor can be configured to capture an image of an ROI of a field of view in high resolution. The image may be referred to as a "fovea region" or an "ROI." The foveated-image sensor may also capture another image of the full field of view at a lower resolution. The portion of the lower-resolution image that is outside the ROI may be referred to as the peripheral region. The image of the ROI may be inset into the other image of the peripheral region. The combine image may be referred to as a foveated image.

Additionally or alternatively, a processor can render or process a foveated image with image data of an ROI at a higher resolution and image data of a peripheral region at a lower resolution. Additionally or alternatively, a processor, a display driver, and/or a display may display foveated image with image data of an ROI displayed at a higher resolution and image data of a peripheral region displayed at a lower resolution.

XR applications may benefit from foveated image capturing, rendering, processing, and/or displaying. For example, some XR HMDs may render, process, and/or display foveated image data, (e.g., virtual content to be displayed at the HMD) in a foveated manner. The image data may be rendered, processed, and/or displayed at different qualities and/or resolutions at different regions of the image data. For example, the image data may be rendered at a highest resolution and/or quality in an ROI and at a lower resolution and/or quality outside the ROI.

As another example, some XR HMDs may implement video see through (VST). In VST, an XR HMD may capture images of a field of view of a user and display the images to the user as if the user were viewing the field of view directly. In some cases, the field of view of the user may correspond to a field of view of the user while wearing the XR HMD (e.g., the area viewable by the user through one or more lenses or glass of the HMD or on a display of the HMD). While displaying the images of the field of view, the XR HMD may alter or augment the images providing the user with an altered or augmented view of the environment of the user (e.g., providing the user with an XR experience). VST may benefit from foveated image capture and/or foveated image processing.

Foveated image sensing, rendering, processing, and/or displaying may be useful in XR because foveated-image sensing, rendering, processing, and/or displaying may allow an XR HMD to conserve computational resources (e.g., power, processing time, communication bandwidth etc.).

For example, a foveated image of a field of view (or a smaller area) may be smaller in data size than a full-resolution image of the same field of view (or the same smaller area) because the peripheral region of the foveated image may have lower resolution and may be stored using less data. Thus, capturing, storing, processing, rendering, and/or displaying a foveated image rather than a full-resolution image may conserve computational resources.

Some devices may capture, process, render, and/or display foveated images based on a gaze of a user. For example, some devices may determine a gaze of a view (e.g., where the viewer is gazing within an image frame) and determine an ROI for foveated imaging based on the gaze. The device may then capture, render, process, and/or display image data (e.g., foveated image data) to have the highest resolution in the ROI and lower resolution outside the ROI (e.g., at "peripheral regions").

Systems, apparatuses, methods (also referred to as processes), and computer-readable media (collectively referred to herein as "systems and techniques") are described herein for foveated imaging. For example, the systems and techniques described herein may determine one or more ROIs for foveated image capturing, rendering, processing, and/or displaying. The systems and techniques may determine the ROIs based on a gaze of the user and based on content of image data. For example, rather than determining an ROI based only on a current gaze of a user, the systems and techniques may determine the ROI based, at least in part, on content of image data being displayed to the user or that may be displayed to a user (e.g., content that the system predicts may be displayed to a user).

In some examples, when the content (or the user's environment) is static, the user's gaze may be static, for example, remaining on one point in the content (or environment) for a duration. While the user's gaze is static, the systems and techniques can select a relatively small ROI size based on user's eye gaze and therefore apply more advance image processing to the selected ROI. However, when the content is changing (or the user's environment is changing), then the user's gaze may follow the changing content (or change in the environment). When the content (or the environment) is changing, the systems and techniques may determine a new ROI (e.g., in place of or in addition to a previously-determined ROI), or adjust a previously-determined ROI, responsive to the change. In some aspects, the systems and techniques may make the change prior to a change in the user's gaze, for example, anticipating (e.g., based on a prediction) that the user's gaze will change in response to the change to the content (or environment). Additionally or alternatively, the systems and techniques may change the ROI size based on the rate and direction of change of the content (and/or environment). Further, the systems and techniques may adjust the image-processing complexity to balance or improve a computing workload.

For example, a user of an XR HMD may gaze at an object in a lower-left portion of the user's field of view. The HMD may track the user's gaze and determine a gaze-based ROI in the lower-left portion of the user's field of view. Based on determining the gaze-based ROI, an imaging system of the HMD may capture, render, process and/or display image data related to the gaze-based ROI at a first resolution. The imaging system of the HMD may capture, render, process, and/or display image data outside the gaze-based ROI at a second resolution (the second resolution being lower than the first resolution). If the XR HMD is implementing VST, the imaging system of the XR HMD may capture, process, and/or display image data related to the gaze-based ROI at the first resolution and capture, process, and/or display image data outside the gaze-based ROI at the second resolution. If the XR HMD is generating virtual content (whether or not the XR HMD is implementing VST), the imaging system of the XR HMD may render, process, and/or display virtual content related to the gaze-based ROI at the first resolution and render, process, and/or display virtual content outside both the gaze-based ROI and the content-based ROI at the second resolution.

The XR HMD can also determine a content-based ROI. If the XR HMD is implementing VST, the systems and techniques may detect a real-world object entering a field of view of the user (or a real-world object already present in the field of view of the user that is moving or changing). Based on a number of factors (e.g., a weighted combination of factors), the systems and techniques may determine a content-based ROI for the real-world object. For example, a person may enter a top-right portion of the field of view of the user. Based on the number of factors, the systems and techniques may determine a content-based ROI related to the person in the field of view of the user. If the XR HMD is generating virtual content (whether or not the XR HMD is implementing VST), the XR HMD may determine, based on a number of factors, a content-based ROI for a portion of the virtual content. For example, a virtual character (e.g., an avatar of a person or a simulated character) may enter a top-right portion of the field of view of the user. Based on the number of factors, the systems and techniques may determine a content-based ROI related to the virtual character in the field of view of the user.

After determining the content-based ROI (either in the VST case or the virtual-content generation case) the imaging system of the XR HMD may capture, render, process, and/or display image data related to the content-based ROI at the first resolution (or at another resolution) and to continue to capture, render, process, and/or display image data outside the content-based ROI at the second resolution.

In some aspects, the imaging system of the XR HMD may determine to capture, render, process, and/or display image data based on both the gaze-based ROI and the content-based ROI. For example, the imaging system of the XR HMD may capture, render, process, and/or display image data at both the gaze-based ROI and the content-based ROI at a high resolution and/or quality (e.g., the same or high resolution and/or quality or at different high resolutions and/or qualities). The imaging system of the XR HMD may continue to capture, render, process, and/or display image data outside both the gaze-based ROI and the content-based ROI at a lower resolution and/or quality.

The number of factors on which the content-based ROI is determined may be related to a probability that the user will gaze at the content. For example, the number of factors may be related to whether the content is eye catching, visually interesting, and/or significant to the user. For example, the number of factors may include colors of the content, brightness of the content, size of the content, visual complexity of the content, movement of the content, speed or velocity of movement of the content, a classification of the content, a semantic label of the content, etc.

Additionally or alternatively, the systems and techniques may determine an ROI weighting for the gaze-based ROI and another ROI weighting for the content-based ROI. For example, the systems and techniques may determine a weighting for the content-based ROI based on a weighted combination of the number of factors (which may be related to a probability that the user will gaze at the content). The systems and techniques may determine a weighting for the gaze-based ROI based on the weighting of the content-based ROI and/or based on a weighted combination of the number of factors as applied to content at which the user is gazing. The systems and techniques may capture, render, process, and/or display image data of the content-based ROI based on the weighting of the content-based ROI and the systems and techniques may capture, render, process, and/or display image data of the gaze-based ROI based on the weighting of the gaze-based ROI. Capturing, rendering, processing, and/or displaying based on weighting may include determining a resolution and/or a number of processing steps to implement based on the weighting. For example, a higher weighting may indicate a higher resolution and a higher number of processing steps while a lower weighting may indicate a lower resolution and a lower number of processing steps.

In some aspects, the systems and techniques may determine a combined ROI based on the gaze-based ROI and the content-based ROI. For example, in some aspects, the systems and techniques may determine a combined ROI that is large enough to encompass both the gaze-based ROI and the content-based ROI. The systems and techniques may capture, render, process, and/or display image data in the combined ROI at a high resolution and/or quality (and capture, render, process, and/or display image data outside the combined ROI at a lower resolution and/or quality).

Various aspects of the application will be described with respect to the figures below.

FIG. 1 is a diagram illustrating an example extended-reality (XR) system 100, according to aspects of the disclosure. As shown, XR system 100 includes an XR device 102. XR device 102 may implement, as examples, image-capture, object-detection, gaze-tracking, view-tracking, localization, computational and/or display aspects of extended reality, including virtual reality (VR), augmented reality (AR), and/or mixed reality (MR). For example, XR device 102 may include one or more scene-facing cameras that may capture images of a scene in which user 108 uses XR device 102. XR device 102 may detect objects in the scene based on the images of the scene. Further, XR device 102 may include one or more user-facing cameras that may capture images of eyes of user 108. XR device 102 may determine a gaze of user 108 based on the images of user 108. XR device 102 may determine an object of interest in the scene based on the gaze of user 108. XR device 102 may obtain and/or render information (e.g., text, images, and/or video based on the object of interest). XR device 102 may display the information to a user 108 (e.g., within a field of view 110 of user 108).

XR device 102 may display the information to be viewed by a user 108 in field of view 110 of user 108. For example, in a "see-through" configuration, XR device 102 may include a transparent surface (e.g., optical glass) such that information may be displayed on (e.g., by being projected onto) the transparent surface to overlay the information onto the scene as viewed through the transparent surface. In a "pass-through" configuration or a "video see-through" configuration, XR device 102 may include a scene-facing camera that may capture images of the scene of user 108. XR device 102 may display images or video of the scene, as captured by the scene-facing camera, and information overlaid on the images or video of the scene.

In various examples, XR device 102 may be, or may include, a head-mounted device (HMD), a virtual reality headset, and/or smart glasses. XR device 102 may include one or more cameras, including scene-facing cameras and/or user-facing cameras, a GPU, one or more sensors (e.g., such as one or more inertial measurement units (IMUs), image sensors, and/or microphones), and/or one or more output devices (e.g., such as speakers, display, and/or smart glass).

In some aspects, XR device 102 may be, or may include, two or more devices. For example, XR device 102 may include a display device and a processing device. The display device may generate data, such as image data (e.g., from user-facing cameras and/or scene-facing cameras) and/or motion data (from an inertial measurement unit (IMU)). The display device may provide the data to the processing device, for example, through a wireless connection. The processing device may process the data and/or other data. Further, the processing unit may generate data to be displayed at the display device. The processing device may provide the generated data to the display device, for example, through the wireless connection.

Figure 2:
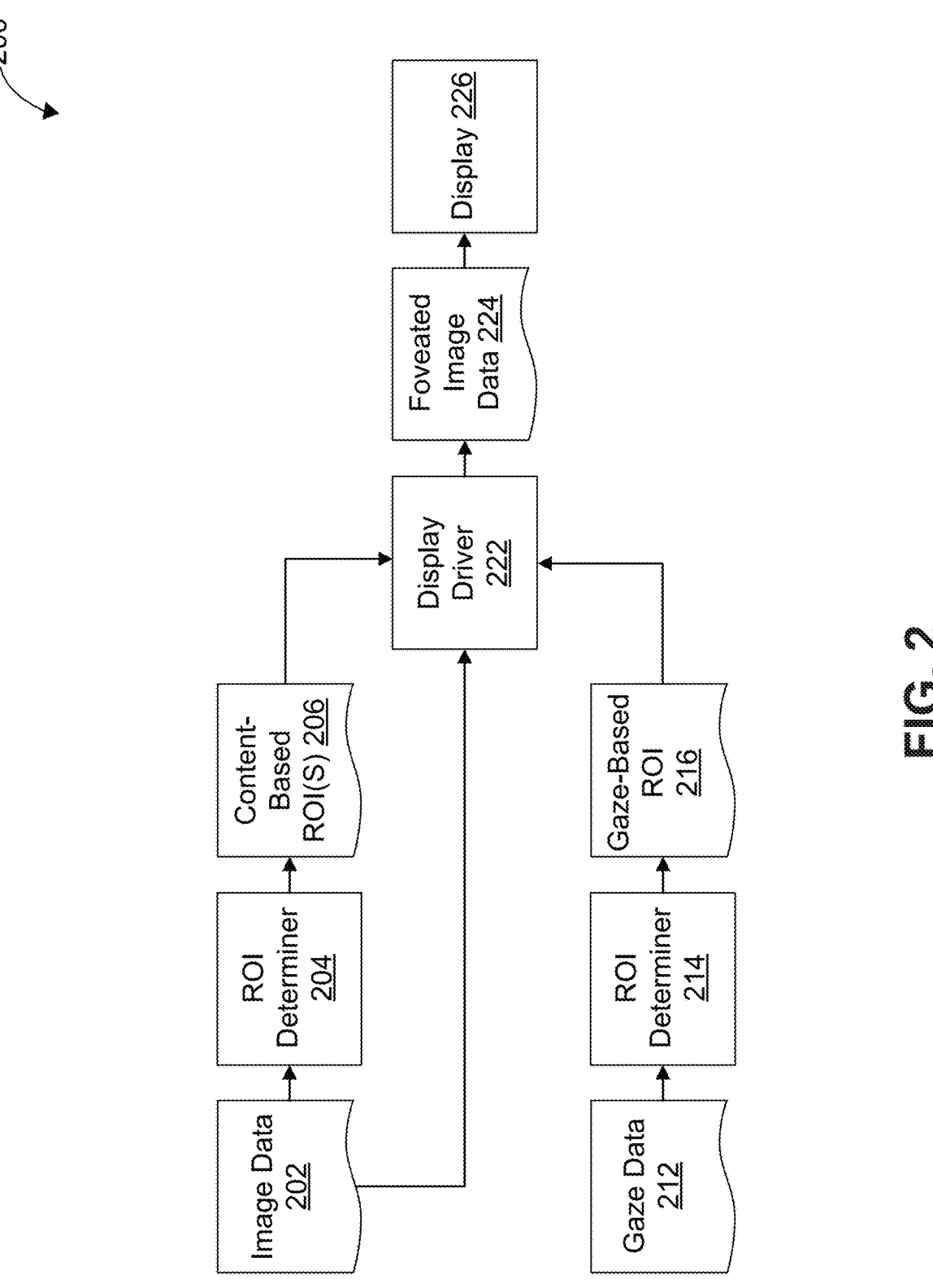
FIG. 2 is a block diagram illustrating an example system for foveated imaging, according to various aspects of the present disclosure.

FIG. 2 is a block diagram illustrating an example system 200 for foveated imaging, according to various aspects of the present disclosure. System 200 may be implemented in an XR device, such as XR device 102 of FIG. 1. In general, system 200 may obtain image data 202, determine one or more ROIs within image data 202, and display foveated image data 224 (e.g., at display 226) with image data of the one or more ROIs at a higher resolution than image data of the periphery.

System 200 may obtain image data 202 to display at display 226. In some aspects, image data 202 may be, or may include, virtual content to display at display 226 to provide an XR experience. For example, image data 202 may be, or may include, virtual characters or objects to display at display 226. In some aspects, the virtual content may be related to an environment of a user. For example, the virtual content may be anchored in the environment. Additionally or alternatively, the virtual content may overlay objects in the environment to change the appearance of the objects in the field of view of the user, for example, changing the color of a wall or tree. Additionally or alternatively, image data 202 may be, or may include, images of the environment. For example, in a VST use case, image data 202 may be, or may include, images of the environment captured by a scene-facing camera.

ROI determiner 204 may determine one or more ROIs, for example, content-based ROI(s) 206 based on image data 202. For example, ROI determiner 204 may determine a number of regions within image data 202 that are of interest based on content depicted in the ROIs. ROI determiner 204 may determine content-based ROI(s) 206 based on a number of factors. The number of factors may be related to a probability that the user will be interested in the content or turn their gaze to the content. For example, the number of factors may be related to whether the content is eye catching, visually interesting, and/or significant to the user. The number of factors may include, for example, colors of the content, brightness of the content, visual complexity of the content, movement of the content, a classification of the content, a semantic label of the content, etc.

In some aspects, ROI determiner 204 analyze content of image data 202 to determine content-based ROI(s) 206 based on the number of factors. In some aspects, ROI determiner 204 may analyze pixels of image data 202 to determine whether the colors, the brightness, and/or visual complexity of the pixels satisfy one or more thresholds indicating that the pixels may be part of a region of interest. In some aspects, ROI determiner 204 may analyze multiple instances of image data 202 to determine movement of content over time. In some aspects, ROI determiner 204 may use object-detection techniques and/or edge-detection techniques to determine regions corresponding to content.

Additionally or alternatively, in some aspects, ROI determiner 204 may determine or receive semantic labels indicative of information regarding content (e.g., objects, people, places, etc. of the content) in image data 202. For example, ROI determiner 204 may include, or receive input from, a semantic labeler that may label pixels of image data 202 with semantic labels. The semantic labels may indicate information about the content, for example, semantic labels may identify the content or describe the content. For example, in cases in which image data 202 includes VST content, the semantic labeler may label objects, people, or places in the VST content. In cases in which image data 202 includes virtual content, the virtual content may be associated with semantic labels. For example, a virtual-content provider may provide virtual content in the form of images and may also provide labels associated with the virtual content, for example, identifying virtual objects and/or characters. In such cases, the semantic labeler may, or may not, associate the virtual content with additional semantic labels.

Additionally or alternatively, in some aspects, ROI determiner 204 may determine an association between the content and the user. For example, ROI determiner 204 may receive, or determine, a label indicative of an identify of a person. The person may be physically present in the environment and image data 202 may be VST content. ROI determiner 204, or a person-identification technique, may identify the person. Additionally or alternatively, image data 202 may include virtual content associated with the person, for example, an avatar. ROI determiner 204 may determine whether the user of system 200 knows the person (e.g., based on contacts and/or social-media interactions). ROI determiner 204 may determine whether content (VST content of virtual content) related to the person is of interest to the user based on the association, for example, based on whether the user knows the person.

As another example, ROI determiner 204 may receive, may receive, or determine, a label indicative of an identity of an object. Further the label may indicate ownership of the object. For example, the label may indicate the user owns the object or that the object can be claimed by the user. The object may be physically present in the environment and represented in VST content of image data 202 or the object may be virtual and be represented in virtual content of image data 202. ROI determiner 204 may determine whether the object is of interest based, at least in part, on the ownership of the object.

In some aspects, for a given item of content, ROI determiner 204 may determine a respective weight value for each factor of a plurality of factors (e.g., color, brightness, visual complexity, movement, and/or a classification or label) and determine a score for the plurality of factors based on the respective weight value determined for each factor of the plurality of factors (e.g., based on a weighted combination of the factors and their respective weights). In one illustrative example, a score can be determined as a weighted combination of factors as $Score = w_1 f_1 + w_2 f_2 + w_3 f_3 \ldots + w_n f_n$, where $w_1$ through $w_n$ are weights, $f_1$ through $f_n$ are factors, and n is an integer value. In some aspects, the weights $w_1$ through $w_n$ sum to a value of 1. Further, ROI determiner 204 may wherein determine that the content satisfies a criterion (e.g., a criterion for being identified as of interest) by determining that the score for the plurality of factors is greater than a score threshold (e.g., the score is greater than 80%, 85%, etc.).

Gaze data 212 may be, or may include, an indication of an orientation of eyes of a user. Gaze data 212 may be determined based on one or more images of an eye, or eyes, of a user (e.g., captured by a user-facing camera). Gaze data 212 may, or may not, be related to display 226. For example, in some aspects, gaze data 212 may be related to display 226 such that gaze data 212 indicates where in display 226 the user is gazing. In other aspects, ROI determiner 214 may determine a relationship between gaze data 212 and display 226 such that ROI determiner 214 may determine where in display 226 the user is gazing.

ROI determiner 214 may determine an ROI, for example, a gaze-based ROI 216 based on gaze data 212. ROI determiner 214 may relate gaze data 212 to image data 202 that is being displayed at display 226 or that is to be displayed at display 226.

Display driver 222 may be, may include, or may be implemented by, one or more processors, such as general-purpose processors (e.g., central processing units (CPUs), graphics processing units (GPUs), and/or image-signal processors (ISPs), and/or other circuitry. Display driver 222 may process and/or condition image data 202 for display at display 226. Display driver 222 may format image data 202 into a format suitable to be displayed by display 226.

Display driver 222 may generate foveated image data 224 based on image data 202, content-based ROI(s) 206, and gaze-based ROI 216. Foveated image data 224 may be, or may include, ROIs including image data at one or more higher resolutions and peripheral regions including images data at one or more lower resolutions. For example, foveated image data 224 may include image data 202 of content-based ROI(s) 206 at a first resolution, image data 202 of gaze-based ROI 216 at a second resolution, and image data 202 of a peripheral region (e.g., image data 202 that is not included in either of content-based ROI(s) 206 or gaze-based ROI 216) at a third resolution. The first and second resolutions may be higher than the third resolution.

Additionally or alternatively, display driver 222 may perform more processing operations (e.g., image-processing operations) on image data 202 of content-based ROI(s) 206 and/or gaze-based ROI 216 than image data 202 of the peripheral region. For example, display driver 222 may perform noise-reduction techniques and/or image-enhancement techniques (e.g., super resolution techniques) on image data 202 of content-based ROI(s) 206 and/or image data 202 of gaze-based ROI 216 and not perform noise-reduction techniques and/or image-enhancement techniques (or perform less computationally-expensive noise-reduction techniques) on image data 202 of the peripheral region.

In some aspects, ROI determiner 204 may provide content-based ROI(s) 206 to the image-capture system that captures image data 202 and the image-capture system may capture image data 202 based on content-based ROI(s) 206. For example, the image-capture system may perform foveated image capture based on content-based ROI(s) 206 to capture image data in content-based ROI(s) 206 at a higher resolution than image data outside content-based ROI(s) 206. Additionally or alternatively, ROI determiner 214 may provide gaze-based ROI 216 to the image-capture system and the image-capture system may capture image data 202 based on gaze-based ROI 216.

FIG. 3A through FIG. 3F include respective example images, including ROIs, which may be determined and/or displayed by system 200 of FIG. 2, according to various aspects of the present disclosure. Image data of the example respective ROIs may be displayed at a higher resolution than image data of the respective peripheral regions of the respective image frames. Additionally or alternatively, the image data of the respective ROIs may be processed using more processing operations than are used in processing the image data of the respective peripheral regions.

For example, system 200 may determine ROI 312 (which may be an example of content-based ROI(s) 206 and/or gaze-based ROI 216) and display driver 222 may determine image 310 (which may be an example of foveated image data 224) including ROI 312 and periphery 318. Display 226 may display image 310 including ROI 312 and periphery 318. ROI 312 may have a higher resolution than periphery 318. Additionally or alternatively, ROI 312 may be processed (e.g., by display driver 222 and/or another element of system 200) using more operations than were used in processing periphery 318.

FIG. 3A through FIG. 3F are described in a narrative format as if each of FIG. 3A through FIG. 3F includes image data for a successive time for descriptive purposes. However, system 200 may determine and/or display image data according to any of FIG. 3A through FIG. 3F without regard to any prior or subsequent image data. For example, system 200 may determine and display image 320 including ROI 322, ROI 324, and periphery 328 without having determined and displayed ROI 312 and periphery 318 first.

Turning to the narrative description of FIG. 3A through FIG. 3F, at a first time, system 200 may determine and/or display image 310 of FIG. 3A. Image 310 includes ROI 312 and periphery 318. ROI 312 may be an example of a gaze-based ROI 216 (e.g., determined based on gaze data 212). For example, a user may be looking at a portion of display 226 corresponding to ROI 312. The user may be looking at virtual content or VST content (e.g., images of the environment captured by a scene-facing camera and displayed by display 226). System 200 may render, process, and/or display ROI 312 at a higher resolution than the resolution of periphery 318 based on ROI determiner 214 determining gaze-based ROI 216. Additionally or alternatively, system 200 may use more processing operations when processing ROI 312 than when processing periphery 318.

At a second time, system 200 may determine and/or display image 320 of FIG. 3B. Image 320 includes ROI 322 (which may be an example of gaze-based ROI 216), ROI 324 (which may be an example of content-based ROI(s) 206), and periphery 328. For example, the user may be looking at a portion of display 226 corresponding to ROI 322 (in other words, the user may be looking at ROI 322). ROI determiner 214 may determine ROI 322 based on the user looking at ROI 322.

ROI determiner 204 may determine that ROI 324 may be of interest. For example, ROI determiner 204 may determine that content displayed at a portion of display 226 corresponding to ROI 324 may be of interest. The content may be, or may include, interesting virtual content and/or interesting VST content. ROI determiner 204 may determine that the content is of interest based on a number of factors, such as, colors of the content, brightness of the content, visual complexity of the content, movement of the content, a classification of the content, a semantic label of the content, etc.

In some aspects, ROI determiner 204 may newly determine that ROI 324 is of interest based on a change. For example, system 200 may begin displaying virtual content at ROI 324. As another example, system 200 may change virtual content being displayed at ROI 324. As yet another example, the environment may change and thus VST content at ROI 324 may change.

System 200 may display image 320 including ROI 322 (e.g., a gaze-based ROI), ROI 324 (e.g., a content-based ROI), and periphery 328. ROI 322 may be displayed at a first resolution, ROI 324 may be displayed at a second resolution, and periphery 328 may be displayed at a third resolution. The resolution of ROI 322 and the resolution of ROI 324 may each be higher than the resolution of periphery 328. Additionally or alternatively, the image data of ROI 322 may be processed using a first number of operations, the image data of ROI 324 may be processed using a second number of operations, and the image data of periphery 328 may be processed using a third number of operations. The first number of operations and the second number of operations may be greater than the third number of operations.

The resolution of ROI 322 may, or may not, be the same as the resolution of ROI 324. Additionally or alternatively, the number of operations with which ROI 322 was processed may, or may not, be the same as the number of operations with which ROI 324 was processed. In some aspects, system 200 may determine a weighting for ROI 322 and ROI 324. The weighting may describe a relationship (e.g., a ratio) between the resolution of ROI 322 and the resolution of ROI 324 and/or a relationship (e.g., a ratio) between the number of operations used to process ROI 322 and the number of operations used to process ROI 324. The weighting may be based on, for example, a number of factors, such as, colors of the content of ROI 324, brightness of the content of ROI 324, visual complexity of the content of ROI 324, movement of the content of ROI 324, a classification of the content of ROI 324, a semantic label of the content of ROI 324, etc.

At a third time, system 200 may determine and/or display image 330 of FIG. 3C. Image 330 includes ROI 332 (which may be an example of gaze-based ROI 216), ROI 334 (which may be an example of content-based ROI(s) 206), and periphery 338. The third time may follow the second time. Between the second time and the third time, the user may shift their gaze from the ROI 322 to ROI 332. Gaze data 212 may track the shift and ROI determiner 214 may determine gaze-based ROI 216 to reflect the shift. Thus, ROI 332 may be in a different position within image 330 than ROI 322 is within image 320. The content on which ROI 324 is based may move between the second time and the third time. ROI determiner 204 may determine ROI 334 based on the content at the third time. In some aspects, ROI determiner 204 may track the content. For example, system 200 may track objects in the scene and/or track a pose of the camera capturing image data 202 of the scene. In other aspects, ROI determiner 204 may newly determine ROI 334 based on new image data 202.

At a fourth time, system 200 may determine and/or display image 340 of FIG. 3D. Image 340 includes ROI 342 (which may be an example of gaze-based ROI 216), ROI 344 (which may be an example of content-based ROI(s) 206), and periphery 348. The fourth time may follow the third time. The content on which ROI 334 is based may move and/or change size (at least in the field of view of the user) between the third time and the fourth time. ROI determiner 204 may determine ROI 344 based on the content at the fourth time. In some aspects, ROI determiner 204 may track the content. For example, system 200 may track objects in the scene and/or track a pose of the camera capturing image data 202 of the scene. In other aspects, ROI determiner 204 may newly determine ROI 344 based on new image data 202.

At a fifth time, system 200 may determine and/or display image 350 of FIG. 3E. Image 350 includes ROI 352 (which may be an example of gaze-based ROI 216), ROI 354 (which may be an example of content-based ROI(s) 206), and periphery 358. The fifth time may follow the fourth time. Gaze data 212 may track a shift of the gaze of the user between the fourth time and the fifth time. ROI determiner 214 may determine gaze-based ROI 216 to reflect the shift. The position of ROI 352 in image 350 may reflect the shift. The content on which ROI 344 is based may move and/or change size (at least in the field of view of the user) between the fourth time and the fifth time. ROI determiner 204 may determine ROI 354 based on the content at the fifth time (either by tracking the content and/or the scene-facing camera, or not).

ROI 352 and ROI 354 may overlap. Display driver 222 may cause any overlapping portion to be displayed at the resolution of ROI 352 and ROI 354 that is higher. For example, in some aspects, ROI 352 may be weighted higher than ROI 354. As such, in image 350, an entirety of ROI 352 (including the portion of ROI 352 that is also in ROI 354) may be at the resolution of ROI 352.

In some aspects, system 200 may prevent the overlapping portions of ROI 352 and ROI 354 from being processed twice. For example, system 200 may cause the overlapping portion to be processed once, according to the higher weighted one of ROI 352 and ROI 354. For example, ROI 352 may be weighted higher than ROI 354 and may be processed using more operations than the number of operations used to process ROI 354. In such cases, the entirety of ROI 352 (including the overlapping portion) may be processed using the higher number of operations. Further, the overlapping portion may not be processed when the remainder of ROI 354 is processed.

At a sixth time, system 200 may determine and/or display image 360 of FIG. 3F. Image 360 includes ROI 362 and periphery 368. ROI 362 may be based on gaze data 212 and/or content of image data 202. For example, the sixth time may be after the fifth time. Gaze data 212 may have tracked the gaze of the user until the user gazed at the content of content-based ROI(s) 206. In some aspects, based on a coincidence of a gaze-based ROI and a content-based ROI, system 200 may use the gaze-based ROI.

In some aspects, ROI determiner 204 may determine a resolution of (and/or number of processing steps to implement for) a content-based ROI based on a proximity between the content-based ROI and the gaze-based ROI and/or based on a change in the proximity between the content-based ROI and the gaze-based ROI over time. For example, at the second time, ROI determiner 204 may determine a first resolution of (and/or number of processing steps to implement for) ROI 324. The first resolution may be lower than the resolution of ROI 322 (e.g., based on the user gazing at ROI 322 and the user not yet gazing at ROI 324). At the second time, ROI 332 is closer to ROI 334. ROI determiner 204 may determine a second resolution of (and/or number of processing steps to implement for) ROI 334 based on the closer distance between ROI 332 and ROI 334 (and/or based on the distance between ROI 332 and ROI 334 decreasing between the second time and the third time). The second resolution of (and/or number of processing steps to implement for) ROI 334 may be higher than the first resolution of (and/or number of processing steps to implement for) ROI 324 (e.g., based on the user gazing closer to ROI 334 than ROI 324).

In some aspects, ROI determiner 204 may continue to update the resolution of (and/or number of processing steps to implement for) the content-based ROI based on the proximity between the content-based ROI and the gaze-based ROI. In some aspects, ROI determiner 204 may update the resolution of (and/or number of processing steps to implement for) the content-based ROI such that as the content-based ROI and the gaze-based ROI overlap (e.g., as illustrated in image 350 of FIG. 3E) and/or merge (e.g., as illustrated in image 360 of FIG. 3F), the resolution of (and/or number of processing steps to implement for) the content-based ROI matches the resolution of (and/or number of processing steps to implement for) the gaze-based ROI.

In some aspects, ROI determiner 204 may decrease the resolution of (and/or number of processing steps to implement for) the content-based ROI if the proximity between the content-based ROI and the gaze-based ROI increases. ROI determiner 204 may decrease the resolution of (and/or number of processing steps to implement for) the content-based ROI, if the user shifts their gaze away from the content-based ROI. For example, if the user gazes toward (e.g., as illustrated by image 350 of FIG. 3E) or at (e.g., as illustrated by image 360 of FIG. 3F) the content-based ROI, then gazes away (e.g., as illustrated by image 320 of FIG. 3B), ROI determiner 204 may determine to decrease the resolution of (and/or number of processing steps to implement for) the content-based ROI (e.g., based on the user gazing away from the content-based ROI, which may be an indication that the content-based ROI is not of interest to the user).

FIG. 4A through FIG. 4F include respective example images, including ROIs, which may be determined and/or displayed by system 200 of FIG. 2, according to various aspects of the present disclosure. Image data of the example respective ROIs may be displayed at a higher resolution than image data of the respective peripheral regions of the respective image frames. Additionally or alternatively, the image data of the respective ROIs may be processed using more processing operations than are used in processing the image data of the respective peripheral regions.

Figures 4A, 4B, 4C, 4D, 4E, 4F:
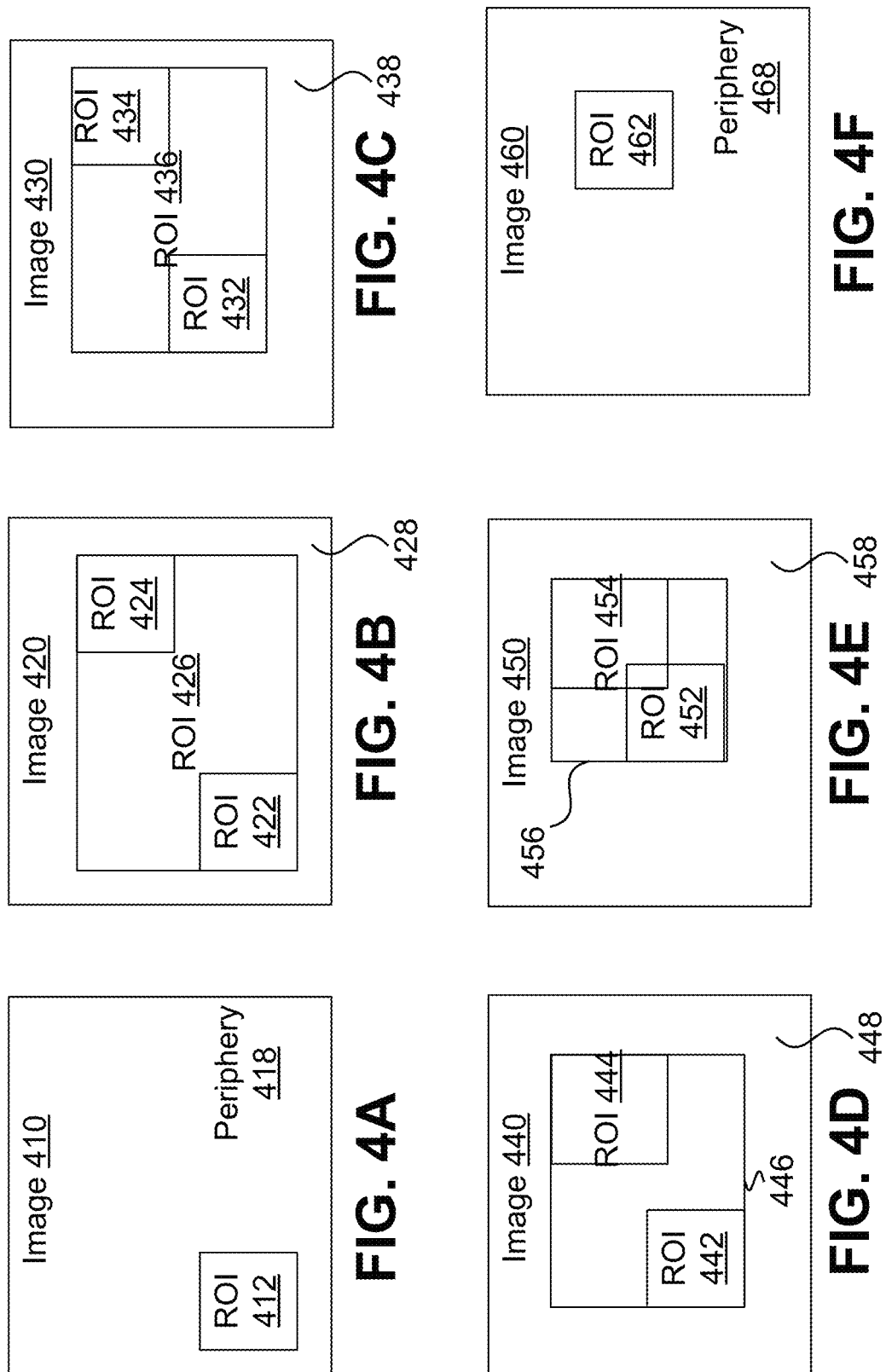
FIG. 4A through FIG. 4F include respective example images, including ROIs, which may be determined and/or displayed by the example system of FIG. 2, according to various aspects of the present disclosure.

System 200 may determine and/or display image 410 of FIG. 4A. Image 410 includes ROI 412 and periphery 418. ROI 412 may be an example of a gaze-based ROI 216 (e.g., determined based on gaze data 212). System 200 may render, process, and/or display ROI 412 at a higher resolution than the resolution of periphery 418 based on ROI determiner 214 determining gaze-based ROI 216. Additionally or alternatively, system 200 may use more processing operations when processing ROI 412 than when processing periphery 418.

System 200 may determine and/or display image 420 of FIG. 4B. Image 420 includes ROI 422 (which may be an example of gaze-based ROI 216), ROI 424 (which may be an example of content-based ROI(s) 206), combined ROI 426, and periphery 428. For example, the user may be looking at a portion of display 226 corresponding to ROI 422 (in other words, the user may be looking at ROI 422).

ROI determiner 214 may determine ROI 422 based on the user looking at ROI 422. ROI determiner 204 may determine that ROI 424 may be of interest. For example, ROI determiner 204 may determine that content displayed at a portion of display 226 corresponding to ROI 424 may be of interest. ROI 424 may depict virtual and/or VST content.

Further, system 200 may determine (e.g., at display driver 222) combined ROI 426 based on ROI 422 and ROI 424. combined ROI 426 may be size and positioned to include ROI 422 and ROI 424.

System 200 may display combined ROI 426 at a first resolution, and periphery 428 at a second resolution. The resolution of combined ROI 426 may be higher than the resolution of periphery 428. Additionally or alternatively, the image data of combined ROI 426 may be processed using a first number of operations and the image data of periphery 428 may be processed using a second number of operations. The first number of operations may be greater than the second number of operations.

As the gaze-based ROI and/or the content-based ROI change positions (within an image frame) and/or change sizes, the combined ROI may change size and/or position to continue to include the gaze-based ROI and the content-based ROI.

For example, FIG. 4C includes image 430 including ROI 432, ROI 434, combined ROI 436, and periphery 438. Gaze data 212 may track a gaze of the user and update the position of ROI 432 as the gaze changes. System 200 may adjust the size and position of combined ROI 436 based on the updated position (and/or size) of ROI 432. Similarly, system 200 may update the size and/or position of ROI 434 over time (e.g., as relative size and position of the content on which ROI 434 is based changes over time. System 200 may adjust the size and position of combined ROI 436 based on the updated position (and/or size) of ROI 434.

As an example, FIG. 4D includes image 440 including ROI 442, ROI 444, combined ROI 446, and periphery 448. The size and position of combined ROI 446 may be updated based on a change of the gaze of the user and/or an object on which ROI 444 is based. As another example, FIG. 4E includes image 450 including ROI 452, ROI 454, combined ROI 456, and periphery 458. The size and position of combined ROI 456 may be updated based on a change of the gaze of the user and/or an object on which ROI 454 is based.

FIG. 4F includes image 460, which includes ROI 462 and periphery 468. ROI 462 may be based on gaze data 212 and/or content of image data 202. For example, gaze data 212 may have tracked the gaze of the user until the user gazed at the content of content-based ROI(s) 206. In some aspects, based on a coincidence of a gaze-based ROI and a content-based ROI, system 200 may use the gaze-based ROI.

Figure 5A:
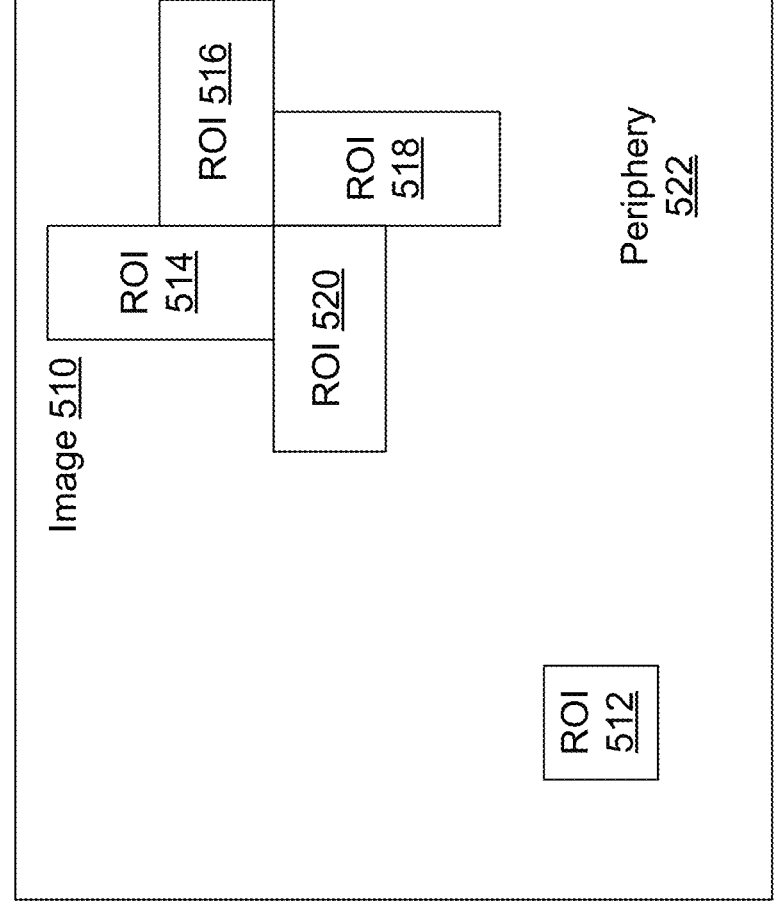
FIG. 5A and FIG. 5B include a respective example images, including ROIs, which may be determined and/or displayed by the example system of FIG. 2, according to various aspects of the present disclosure.

FIG. 5A includes an example image, including ROIs, which may be determined and/or displayed by system 200 of FIG. 2, according to various aspects of the present disclosure. Image data of the example respective ROIs may be displayed at a higher resolution than image data of periphery 522. Additionally or alternatively, the image data of the respective ROIs may be processed using more processing operations than are used in processing the image data of periphery 522.

For example, system 200 may determine ROI 512 (which may be an example of gaze-based ROI 216) and ROI 514, ROI 516, ROI 518, and ROI 520 (all of which may be examples of content-based ROI(s) 206). Display driver 222 may determine image 510 (which may be an example of foveated image data 224) including ROI 512, ROI 514, ROI 516, ROI 518, ROI 520, and periphery 522. Display 226 may display image 510 including ROI 512, ROI 514, ROI 516, ROI 518, ROI 520, and periphery 522. Each of ROI 512, ROI 514, ROI 516, ROI 518, and ROI 520 may have a higher resolution than periphery 522. Additionally or alternatively, each of ROI 512, ROI 514, ROI 516, ROI 518, and ROI 520 may be processed (e.g., by display driver 222 and/or another element of system 200) using more operations than were used in processing periphery 522.

Each of ROI 512, ROI 514, ROI 516, ROI 518, and ROI 520 may have a resolution and/or number of processing steps that is different than others of ROI 512, ROI 514, ROI 516, ROI 518, and ROI 520. For example, system 200 may determine a weighting for each of ROI 512, ROI 514, ROI 516, ROI 518, and ROI 520 and generates each of ROI 512, ROI 514, ROI 516, ROI 518, and ROI 520 based on their respective weightings. The weightings may be based on, for example, a number of factors, such as, colors of the content of the respective ROIs, brightness of the content of the respective ROIs, visual complexity of the content of the respective ROIs, movement of the content of the respective ROIs, a classification of the content of the respective ROIs, a semantic label of the content of the respective ROIs, etc.

In some aspects, each of ROI 514, ROI 516, ROI 518, and ROI 520 may represent portions of the same content (either virtual content or VST content), for example, as illustrated by FIG. 5A. In some aspects, the portions may have different weightings based on the number of factors. For example, a portion of the content may be visually interesting while another portion may not be visually interesting.

Figure 5B:
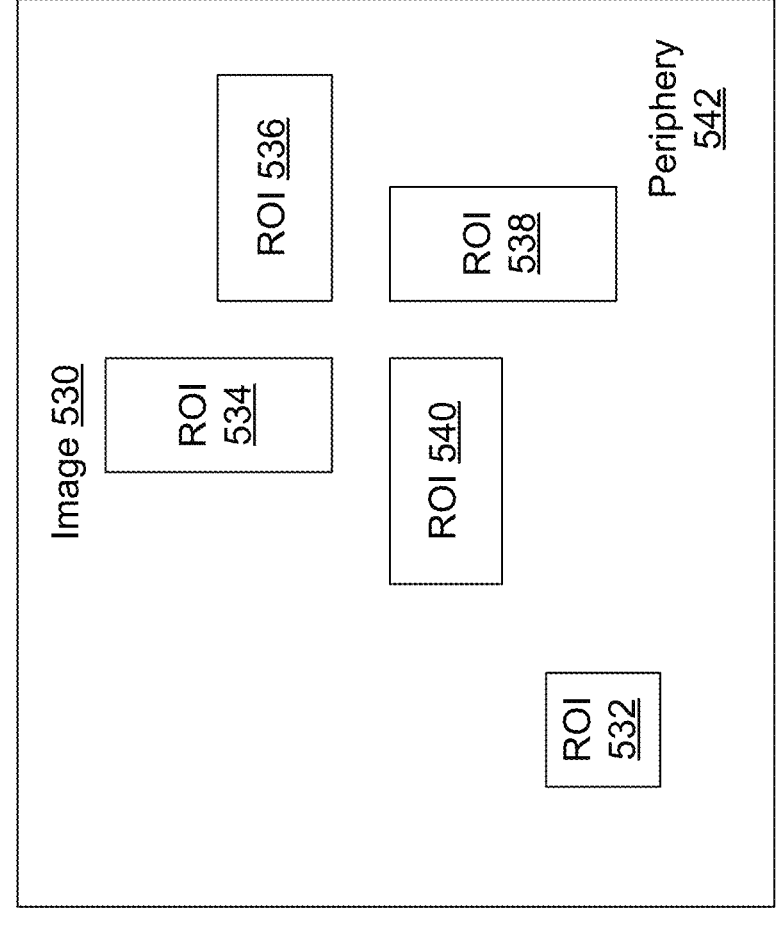

In some aspects, ROIs may represent separate content (either respective items of virtual content or respective items of VST content), for example, as illustrated by FIG. 5B. For example, image 530 of FIG. 5B includes ROI 532 (which may be an example of gaze-based ROI 216) and ROI 534, ROI 536, ROI 538, and ROI 540 (each of which may be an example of one of content-based ROI(s) 206). For instance each of ROI 534, ROI 536, ROI 538, and ROI 540 may be based on a separate item of content. System 200 may determine a weighting for each of ROI 532, ROI 534, ROI 536, ROI 538, and ROI 540 and generates each of ROI 532, ROI 534, ROI 536, ROI 538, and ROI 540 based on their respective weightings.

FIG. 6 is a flow diagram illustrating an example process 600 for displaying images, in accordance with aspects of the present disclosure. One or more operations of process 600 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 600. The one or more operations of process 600 may be implemented as software components that are executed and run on one or more processors.

At block 602, a computing device (or one or more components thereof) may obtain image data for display at a display of a head-mounted device (HMD). For example, system 200 may obtain image data 202 for display at display 226.

In some aspects, the image data may be based on an image captured by a scene-facing camera of the HMD. For example, XR device 102 may include a scene-facing camera that may capture image data 202 of a scene. For example, XR device 102 may operate in a pass through or video see-through configuration.

In some aspects, the image data may be, or may include, virtual content to be displayed at the display of the HMD. For example, image data 202 may be, or may include, virtual content.

At block 604, the computing device (or one or more components thereof) may determine a content-based region of interest (ROI) within the image data based on content of the image data. For example, ROI determiner 204 may determine content-based ROI(s) 206.

In some aspects, the computing device (or one or more components thereof) may determine a size of the content-based ROI based on at least one of: at least one color of the content; a brightness of the content; a visual complexity of the content; movement of the content; or a classification of the content. For example, ROI determiner 204 may determine a size of ROI 324 based on at least one color of the content; a brightness of the content; a visual complexity of the content; movement of the content; and/or a classification of the content. In some aspects, the classification of the content may be, or may include, at least one of: an association between a user of the HMD and the content; a label determined by a classifier; or an assigned label.

In some aspects, the content may be, or may include, at least one of: a person; an object; a virtual object; or a virtual entity. In some aspects, the computing device (or one or more components thereof) may identify the content in the image data; determine, based on a plurality of factors, that the content satisfies a criterion; and responsive to determining that the content satisfies the criterion, determine the content-based ROI within the image data based on the content. For example, ROI determiner 204 may identify content in image data 202, determine, based on a plurality of factors, that the content satisfies a criterion, and determine content-based ROI(s) 206 based on the content. In some aspects, the computing device (or one or more components thereof) may determine a respective weight value for each factor of the plurality of factors; and determine a score for the plurality of factors based on the respective weight value determined for each factor of the plurality of factors. To determine that the content satisfies the criterion, the computing device (or one or more components thereof) may determine that the score for the plurality of factors is greater than a score threshold.

In some aspects, the computing device (or one or more components thereof) may determine the first resolution based on at least one of: at least one color of the content; a brightness of the content; a visual complexity of the content; movement of the content; or a classification of the content. For example, ROI determiner 204 may determine the first resolution based on color of the content; a brightness of the content; a visual complexity of the content; movement of the content; and/or a classification of the content.

In some aspects, the computing device (or one or more components thereof) may determine a level of processing for the content-based ROI based on at least one of: at least one color of the content; a brightness of the content; a visual complexity of the content; movement of the content; or a classification of the content. For example, ROI determiner 204 may determine a level of processing (e.g., a number of processing operations to perform) for content-based ROI(s) 206 based on at least one color of the content; a brightness of the content; a visual complexity of the content; movement of the content; and/or a classification of the content.

At block 606, the computing device (or one or more components thereof) may determine a gaze-based ROI of the image data based on gaze information. For example, ROI determiner 214 may determine gaze-based ROI 216.

In some aspects, the ROI may be determined based on gaze information. For example, ROI determiner 214 may determine gaze-based ROI 216 based on a gaze of a user of the HMD.

In some aspects, the computing device (or one or more components thereof) may determine the gaze information based on an image of an eye of a user captured by a user-facing camera of the HMD. For example, XR device 102 may include a user-facing camera and may capture images of eyes of user 108.

At block 608, the computing device (or one or more components thereof) may display, at the display, content-based-ROI image data of the content-based ROI at a first resolution. For example, display 226 may display foveated image data 224, which may include content-based ROI(s) 206 at a first resolution. As another example, display 226 may display image 320 including ROI 324. ROI 324 may be displayed at the first resolution.

In some aspects, the computing device (or one or more components thereof) may determine the first resolution based on a distance between the content-based ROI and the ROI. For example, system 200 may determine the resolution of ROI 324 based on a distance (e.g., a pixel distance in image 320) between ROI 324 and ROI 322.

At block 610, the computing device (or one or more components thereof) may display, at the display, gaze-based ROI image data of the gaze-based ROI at a second resolution. For example, display 226 may display foveated image data 224, which may include gaze-based ROI 216 at a second resolution. As another example, display 226 may display image 320 including ROI 322. ROI 324 may be displayed at the second resolution. The second resolution may, or may not, be the same as the first resolution.

At block 612, the computing device (or one or more components thereof) may display, at the display, peripheral image data outside the content-based ROI and outside the ROI at a third resolution. For example, display 226 may display foveated image data 224, which may include a peripheral region at a third resolution. As another example, display 226 may display image 320 including periphery 328. Periphery 328 may be displayed at the third resolution.

FIG. 7 is a flow diagram illustrating an example process 700 for displaying images, in accordance with aspects of the present disclosure. One or more operations of process 700 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 700. The one or more operations of process 700 may be implemented as software components that are executed and run on one or more processors.

At block 702, a computing device (or one or more components thereof) may obtain image data for display at a display of a head-mounted device (HMD), wherein the image data is based on at least one image captured by a scene-facing camera of the HMD. For example, system 200 may obtain image data 202 for display at display 226. For example, XR device 102 may include a scene-facing camera that may capture image data 202 of a scene. For example, XR device 102 may operate in a pass through or video see-through configuration.

At block 704, the computing device (or one or more components thereof) may identify content in the image data. For example, ROI determiner 204 may identify content in image data 202.

In some aspects, the content may be, or may include, a person or an object. In some aspects, to identify the content, the computing device (or one or more components thereof) may detect a person in the image data; or detect an object in the image data.

At block 706, the computing device (or one or more components thereof) may determine, based on a plurality of factors, that the content satisfies a criterion. For example, ROI determiner 204 may determine, based on a plurality of factors, that the content satisfies a criterion.

In some aspects, the plurality of factors may be, or may include, at least two of: at least one color of the content; a brightness of the content; a visual complexity of the content; movement of the content; or a classification of the content.

In some aspects, the classification of the content may be, or may include, at least one of: an association between a user of the HMD and the content; or a label determined by a classifier. In some aspects, the content may be, or may include, a person and the classification of the content comprises a relationship between a user of the HMD and the person.

At block 708, the computing device (or one or more components thereof) may responsive to determining that the content satisfies the criterion, determine a content-based region of interest (ROI) within the image data based on the content. For example, ROI determiner 204 may determine content-based ROI(s) 206 based on the content satisfying the criterion.

In some aspects, the computing device (or one or more components thereof) may determine a respective weight value for each factor of the plurality of factors; and determine a score for the plurality of factors based on the respective weight value determined for each factor of the plurality of factors. To determine that the content satisfies the criterion, computing device (or one or more components thereof) may determine that the score for the plurality of factors is greater than a score threshold.

At block 710, the computing device (or one or more components thereof) may display, at the display, ROI image data of the content-based ROI at a first resolution. For example, display 226 may display foveated image data 224, which may include content-based ROI(s) 206 at a first resolution. As another example, display 226 may display image 320 including ROI 324. ROI 324 may be displayed at the first resolution.

At block 712, the computing device (or one or more components thereof) may display, at the display, peripheral image data outside the content-based ROI at a second resolution, wherein the second resolution is lower than the first resolution. For example, display 226 may display foveated image data 224, which may include a peripheral region at a second resolution. As another example, display 226 may display image 320 including periphery 328. Periphery 328 may be displayed at the second resolution.

In some examples, as noted previously, the methods described herein (e.g., process 600 of FIG. 6, process 700 of FIG. 7 and/or other methods described herein) can be performed, in whole or in part, by a computing device or apparatus. In one example, one or more of the methods can be performed by XR system 100 of FIG. 1, system 200 of FIG. 2, or by another system or device. In another example, one or more of the methods (e.g., process 600, process 700, and/or other methods described herein) can be performed, in whole or in part, by the computing-device architecture 1000 shown in FIG. 10. For instance, a computing device with the computing-device architecture 1000 shown in FIG. 10 can include, or be included in, the components of the XR system 100 and/or system 200 and can implement the operations of process 600, process 700 and/or other process described herein. In some cases, the computing device or apparatus can include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device can include a display, a network interface configured to communicate and/or receive the data, any combination thereof, and/or other component(s). The network interface can be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 600, process 700, and/or other process described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 600, process 700, and/or other process described herein can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a computer-readable or machine-readable storage medium, for example, in the form of a computer program comprising a plurality of instructions executable by one or more processors. The computer-readable or machine-readable storage medium can be non-transitory.

As noted above, various aspects of the present disclosure can use machine-learning models or systems.

Figure 8:
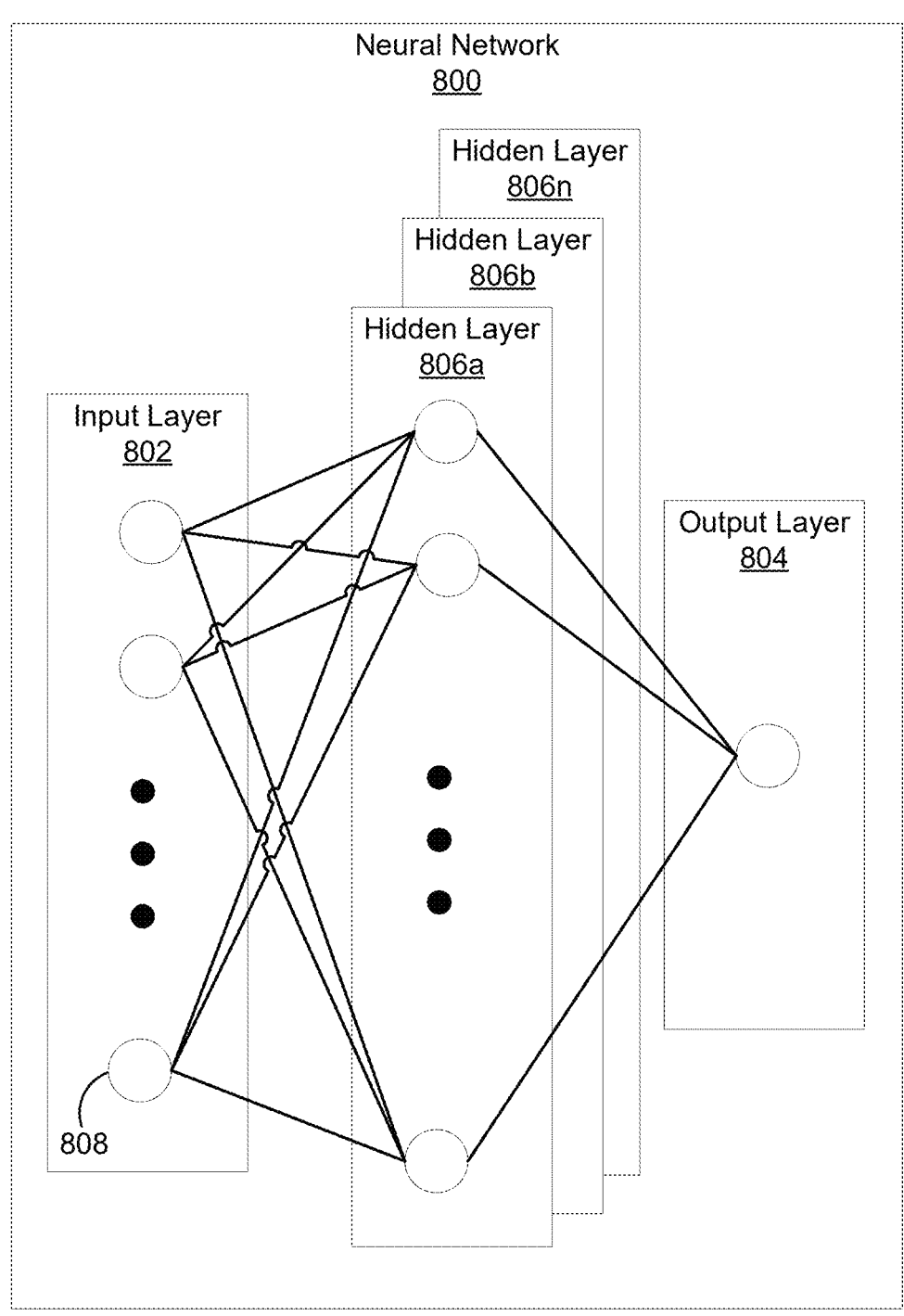
FIG. 8 is a block diagram illustrating an example of a deep learning neural network that can be used to perform various tasks, according to some aspects of the disclosed technology.

FIG. 8 is an illustrative example of a neural network 800 (e.g., a deep-learning neural network) that can be used to implement machine-learning based feature segmentation, implicit-neural-representation generation, rendering, classification, labelling, semantic segmentation, object detection, image recognition (e.g., face recognition, object recognition, scene recognition, etc.), person identification, object identification, feature extraction, authentication, gaze detection, gaze prediction, ROI-identification, and/or automation. For example, neural network 800 may be an example of, can be implemented by, or can implement, ROI determiner 204 of FIG. 2 and/or ROI determiner 214 of FIG. 2.

An input layer 802 includes input data. In one illustrative example, input layer 802 can include data representing image data 202 of FIG. 2 and/or gaze data 212 of FIG. 2. Neural network 800 includes multiple hidden layers, for example, hidden layers 806a, 806b, through 806n. The hidden layers 806a, 806b, through hidden layer 806n include "n" number of hidden layers, where "n" is an integer greater than or equal to one. The number of hidden layers can be made to include as many layers as needed for the given application. Neural network 800 further includes an output layer 804 that provides an output resulting from the processing performed by the hidden layers 806a, 806b, through 806n. In one illustrative example, output layer 804 can provide content-based ROI(s) 206 of FIG. 2 and/or gaze-based ROI 216 of FIG. 2.

Neural network 800 may be, or may include, a multi-layer neural network of interconnected nodes. Each node can represent a piece of information. Information associated with the nodes is shared among the different layers and each layer retains information as information is processed. In some cases, neural network 800 can include a feed-forward network, in which case there are no feedback connections where outputs of the network are fed back into itself. In some cases, neural network 800 can include a recurrent neural network, which can have loops that allow information to be carried across nodes while reading in input.

Information can be exchanged between nodes through node-to-node interconnections between the various layers. Nodes of input layer 802 can activate a set of nodes in the first hidden layer 806a. For example, as shown, each of the input nodes of input layer 802 is connected to each of the nodes of the first hidden layer 806a. The nodes of first hidden layer 806a can transform the information of each input node by applying activation functions to the input node information. The information derived from the transformation can then be passed to and can activate the nodes of the next hidden layer 806b, which can perform their own designated functions. Example functions include convolutional, up-sampling, data transformation, and/or any other suitable functions. The output of the hidden layer 806b can then activate nodes of the next hidden layer, and so on. The output of the last hidden layer 806n can activate one or more nodes of the output layer 804, at which an output is provided. In some cases, while nodes (e.g., node 808) in neural network 800 are shown as having multiple output lines, a node has a single output and all lines shown as being output from a node represent the same output value.

In some cases, each node or interconnection between nodes can have a weight that is a set of parameters derived from the training of neural network 800. Once neural network 800 is trained, it can be referred to as a trained neural network, which can be used to perform one or more operations. For example, an interconnection between nodes can represent a piece of information learned about the interconnected nodes. The interconnection can have a tunable numeric weight that can be tuned (e.g., based on a training dataset), allowing neural network 800 to be adaptive to inputs and able to learn as more and more data is processed.

Neural network 800 may be pre-trained to process the features from the data in the input layer 802 using the different hidden layers 806a, 806b, through 806n in order to provide the output through the output layer 804. In an example in which neural network 800 is used to identify features in images, neural network 800 can be trained using training data that includes both images and labels, as described above. For instance, training images can be input into the network, with each training image having a label indicating the features in the images (for the feature-segmentation machine-learning system) or a label indicating classes of an activity in each image. In one example using object classification for illustrative purposes, a training image can include an image of a number 2, in which case the label for the image can be [0 0 1 0 0 0 0 0 0 0].

In some cases, neural network 800 can adjust the weights of the nodes using a training process called backpropagation. As noted above, a backpropagation process can include a forward pass, a loss function, a backward pass, and a weight update. The forward pass, loss function, backward pass, and parameter update are performed for one training iteration. The process can be repeated for a certain number of iterations for each set of training images until neural network 800 is trained well enough so that the weights of the layers are accurately tuned.

For the example of identifying objects in images, the forward pass can include passing a training image through neural network 800. The weights are initially randomized before neural network 800 is trained. As an illustrative example, an image can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for neural network 800, the output will likely include values that do not give preference to any particular class due to the weights being randomly selected at initialization. For example, if the output is a vector with probabilities that the object includes different classes, the probability value for each of the different classes can be equal or at least very similar (e.g., for ten possible classes, each class can have a probability value of 0.1). With the initial weights, neural network 800 is unable to determine low-level features and thus cannot make an accurate determination of what the classification of the object might be. A loss function can be used to analyze error in the output. Any suitable loss function definition can be used, such as a cross-entropy loss. Another example of a loss function includes the mean squared error (MSE), defined as $$E_{total} = \sum \frac{1}{2}(\text{target} - \text{output})^2.$$

The loss can be set to be equal to the value of $E_{total}$.

The loss (or error) will be high for the first training images since the actual values will be much different than the predicted output. The goal of training is to minimize the amount of loss so that the predicted output is the same as the training label. Neural network 800 can perform a backward pass by determining which inputs (weights) most contributed to the loss of the network and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and $\eta$ denotes a learning rate. The learning rate can be set to any suitable value, with a high learning rate including larger weight updates and a lower value indicating smaller weight updates.

Neural network 800 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. Neural network 800 can include any other deep network other than a CNN, such as an autoencoder, a deep belief nets (DBNs), a Recurrent Neural Networks (RNNs), among others.

Figure 9:
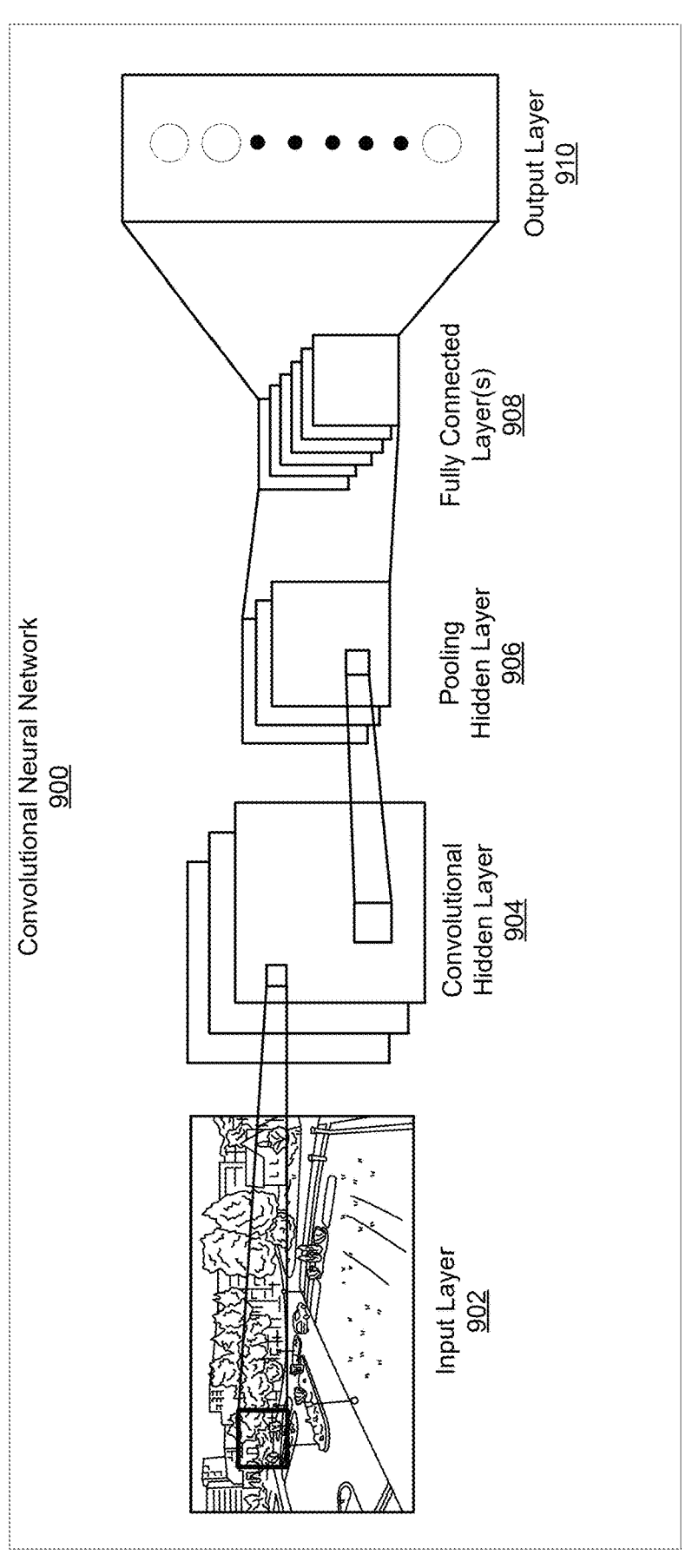
FIG. 9 is a block diagram illustrating an example of a convolutional neural network (CNN), according to various aspects of the present disclosure.

FIG. 9 is an illustrative example of a convolutional neural network (CNN) 900. The input layer 902 of the CNN 900 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 904, an optional non-linear activation layer, a pooling hidden layer 906, and fully connected layer 908 (which fully connected layer 908 can be hidden) to get an output at the output layer 910. While only one of each hidden layer is shown in FIG. 9, one of ordinary skill will appreciate that multiple convolutional hidden layers, non-linear layers, pooling hidden layers, and/or fully connected layers can be included in the CNN 900. As previously described, the output can indicate a single class of an object or can include a probability of classes that best describe the object in the image.

The first layer of the CNN 900 can be the convolutional hidden layer 904. The convolutional hidden layer 904 can analyze image data of the input layer 902. Each node of the convolutional hidden layer 904 is connected to a region of nodes (pixels) of the input image called a receptive field. The convolutional hidden layer 904 can be considered as one or more filters (each filter corresponding to a different activation or feature map), with each convolutional iteration of a filter being a node or neuron of the convolutional hidden layer 904. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 904. Each connection between a node and a receptive field for that node learns a weight and, in some cases, an overall bias such that each node learns to analyze its particular local receptive field in the input image. Each node of the convolutional hidden layer 904 will have the same weights and bias (called a shared weight and a shared bias). For example, the filter has an array of weights (numbers) and the same depth as the input. A filter will have a depth of 3 for an image frame example (according to three color components of the input image). An illustrative example size of the filter array is 5×5×3, corresponding to a size of the receptive field of a node.

The convolutional nature of the convolutional hidden layer 904 is due to each node of the convolutional layer being applied to its corresponding receptive field. For example, a filter of the convolutional hidden layer 904 can begin in the top-left corner of the input image array and can convolve around the input image. As noted above, each convolutional iteration of the filter can be considered a node or neuron of the convolutional hidden layer 904. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 904. For example, a filter can be moved by a step amount (referred to as a stride) to the next receptive field. The stride can be set to 1 or any other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 904.

The mapping from the input layer to the convolutional hidden layer 904 is referred to as an activation map (or feature map). The activation map includes a value for each node representing the filter results at each location of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 904 can include several activation maps in order to identify multiple features in an image. The example shown in FIG. 9 includes three activation maps. Using three activation maps, the convolutional hidden layer 904 can detect three different kinds of features, with each feature being detectable across the entire image.

In some examples, a non-linear hidden layer can be applied after the convolutional hidden layer 904. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 900 without affecting the receptive fields of the convolutional hidden layer 904.

The pooling hidden layer 906 can be applied after the convolutional hidden layer 904 (and after the non-linear hidden layer when used). The pooling hidden layer 906 is used to simplify the information in the output from the convolutional hidden layer 904. For example, the pooling hidden layer 906 can take each activation map output from the convolutional hidden layer 904 and generates a condensed activation map (or feature map) using a pooling function. Max-pooling is one example of a function performed by a pooling hidden layer. Other forms of pooling functions be used by the pooling hidden layer 906, such as average pooling, L2-norm pooling, or other suitable pooling functions. A pooling function (e.g., a max-pooling filter, an L2-norm filter, or other suitable pooling filter) is applied to each activation map included in the convolutional hidden layer 904. In the example shown in FIG. 9, three pooling filters are used for the three activation maps in the convolutional hidden layer 904.

In some examples, max-pooling can be used by applying a max-pooling filter (e.g., having a size of 2×2) with a stride (e.g., equal to a dimension of the filter, such as a stride of 2) to an activation map output from the convolutional hidden layer 904. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 904 having a dimension of 24×24 nodes, the output from the pooling hidden layer 906 will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling) and using the computed values as an output.

The pooling function (e.g., max-pooling, L2-norm pooling, or other pooling function) determines whether a given feature is found anywhere in a region of the image and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 900.

The final layer of connections in the network is a fully-connected layer that connects every node from the pooling hidden layer 906 to every one of the output nodes in the output layer 910. Using the example above, the input layer includes 28×28 nodes encoding the pixel intensities of the input image, the convolutional hidden layer 904 includes 3×24×24 hidden feature nodes based on application of a 5×5 local receptive field (for the filters) to three activation maps, and the pooling hidden layer 906 includes a layer of 3×12×12 hidden feature nodes based on application of max-pooling filter to 2×2 regions across each of the three feature maps. Extending this example, the output layer 910 can include ten output nodes. In such an example, every node of the 3×12×12 pooling hidden layer 906 is connected to every node of the output layer 910.

The fully connected layer 908 can obtain the output of the previous pooling hidden layer 906 (which should represent the activation maps of high-level features) and determines the features that most correlate to a particular class. For example, the fully connected layer 908 can determine the high-level features that most strongly correlate to a particular class and can include weights (nodes) for the high-level features. A product can be computed between the weights of the fully connected layer 908 and the pooling hidden layer 906 to obtain probabilities for the different classes. For example, if the CNN 900 is being used to predict that an object in an image is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 910 can include an M-dimensional vector (in the prior example, M=10). M indicates the number of classes that the CNN 900 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 10:
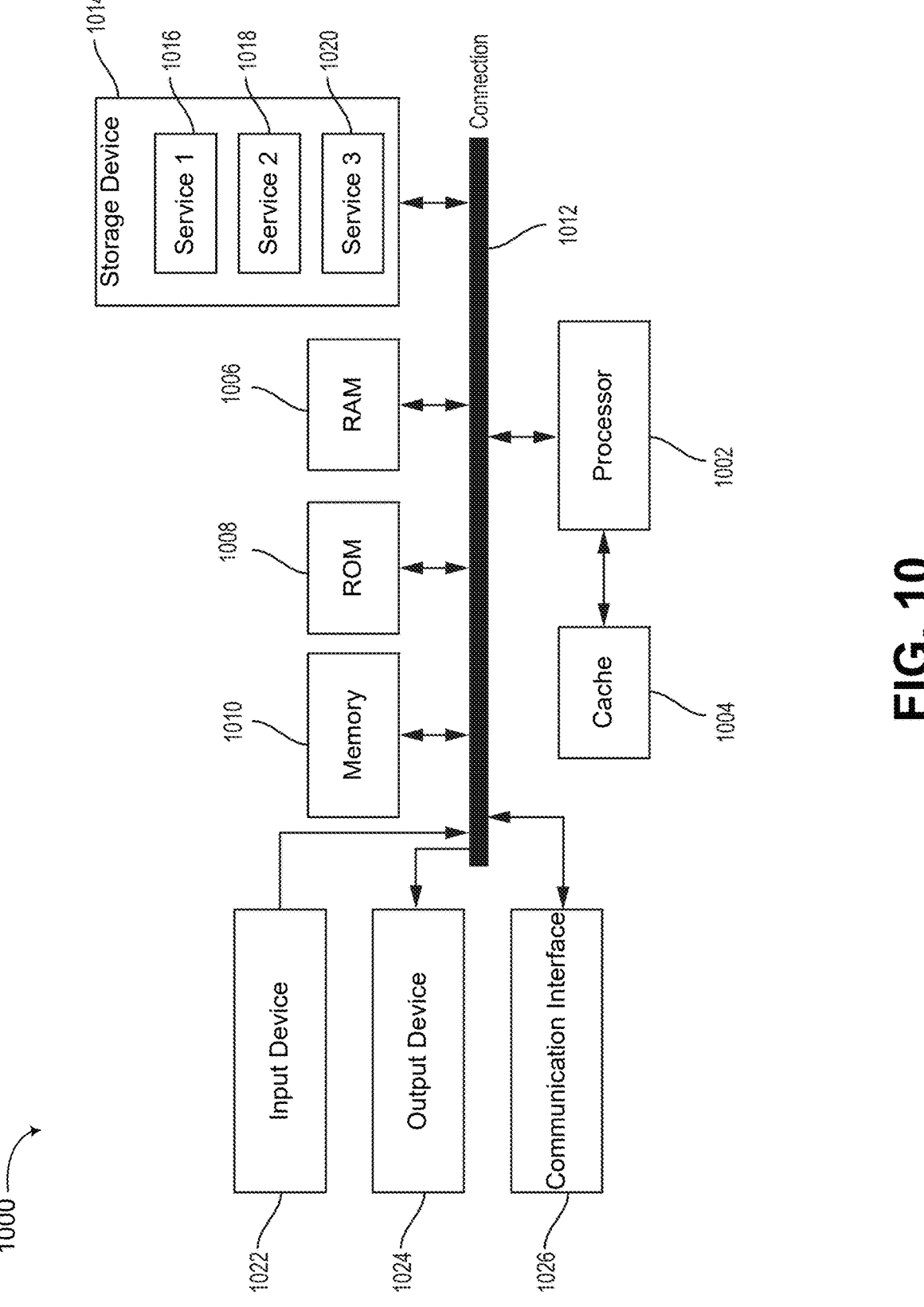
FIG. 10 is a block diagram illustrating an example computing-device architecture of an example computing device which can implement the various techniques described herein.

FIG. 10 illustrates an example computing-device architecture 1000 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing-device architecture 1000 may include, implement, or be included in any or all of XR system 100 of FIG. 1, system 200 of FIG. 2, and/or other devices, modules, or systems described herein. Additionally or alternatively, computing-device architecture 1000 may be configured to perform process 600, process 700, and/or other process described herein.

The components of computing-device architecture 1000 are shown in electrical communication with each other using connection 1012, such as a bus. The example computing-device architecture 1000 includes a processing unit (CPU or processor) 1002 and computing device connection 1012 that couples various computing device components including computing device memory 1010, such as read only memory (ROM) 1008 and random-access memory (RAM) 1006, to processor 1002.

Computing-device architecture 1000 can include a cache of high-speed memory connected directly with, in close proximity to, or integrated as part of processor 1002. Computing-device architecture 1000 can copy data from memory 1010 and/or the storage device 1014 to cache 1004 for quick access by processor 1002. In this way, the cache can provide a performance boost that avoids processor 1002 delays while waiting for data. These and other modules can control or be configured to control processor 1002 to perform various actions. Other computing device memory 1010 may be available for use as well. Memory 1010 can include multiple different types of memory with different performance characteristics. Processor 1002 can include any general-purpose processor and a hardware or software service, such as service 1 1016, service 2 1018, and service 3 1020 stored in storage device 1014, configured to control processor 1002 as well as a special-purpose processor where software instructions are incorporated into the processor design. Processor 1002 may be a self-contained system, containing multiple cores or processors, a bus, memory controller, cache, etc. A multi-core processor may be symmetric or asymmetric.

To enable user interaction with the computing-device architecture 1000, input device 1022 can represent any number of input mechanisms, such as a microphone for speech, a touch-sensitive screen for gesture or graphical input, keyboard, mouse, motion input, speech and so forth. Output device 1024 can also be one or more of a number of output mechanisms known to those of skill in the art, such as a display, projector, television, speaker device, etc. In some instances, multimodal computing devices can enable a user to provide multiple types of input to communicate with computing-device architecture 1000. Communication interface 1026 can generally govern and manage the user input and computing device output. There is no restriction on operating on any particular hardware arrangement and therefore the basic features here may easily be substituted for improved hardware or firmware arrangements as they are developed.

Storage device 1014 is a non-volatile memory and can be a hard disk or other types of computer readable media which can store data that are accessible by a computer, such as magnetic cassettes, flash memory cards, solid state memory devices, digital versatile disks, cartridges, random-access memories (RAMs) 1006, read only memory (ROM) 1008, and hybrids thereof. Storage device 1014 can include services 1016, 1018, and 1020 for controlling processor 1002. Other hardware or software modules are contemplated. Storage device 1014 can be connected to the computing device connection 1012. In one aspect, a hardware module that performs a particular function can include the software component stored in a computer-readable medium in connection with the necessary hardware components, such as processor 1002, connection 1012, output device 1024, and so forth, to carry out the function.

The term "substantially," in reference to a given parameter, property, or condition, may refer to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, magnetic or optical disks, USB devices provided with non-volatile memory, networked storage devices, any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("?") and greater than or equal to ("?") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general-purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, such as, a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for displaying images, the apparatus comprising: at least one memory; and at least one processor coupled to the at least one memory and configured to: obtain image data for display at a display of a head-mounted device (HMD); determine a content-based region of interest (ROI) within the image data based on content of the image data; determine a gaze-based ROI of the image data based on gaze information; display, at the display, content-based-ROI image data of the content-based ROI at a first resolution; display, at the display, gaze-based ROI image data of the gaze-based ROI at a second resolution; and display, at the display, peripheral image data outside the content-based ROI and outside the ROI at a third resolution.

Aspect 2. The apparatus of aspect 1, wherein the at least one processor is configured to determine the gaze information based on an image of an eye of a user captured by a user-facing camera of the HMD.

Aspect 3. The apparatus of any one of aspects 1 or 2, wherein the at least one processor is configured to determine the first resolution based on a distance between the content-based ROI and the gaze-based ROI.

Aspect 4. The apparatus of any one of aspects 1 to 3, wherein the image data is based on an image captured by a scene-facing camera of the HMD.

Aspect 5. The apparatus of any one of aspects 1 to 4, wherein the image data comprises virtual content to be displayed at the display of the HMD.

Aspect 6. The apparatus of any one of aspects 1 to 5, wherein the at least one processor is configured to determine a size of the content-based ROI based on at least one of: at least one color of the content; a brightness of the content; a visual complexity of the content; movement of the content; or a classification of the content.

Aspect 7. The apparatus of aspect 6, wherein the classification of the content comprises at least one of: an association between a user of the HMD and the content; a label determined by a classifier; or an assigned label.

Aspect 8. The apparatus of any one of aspects 1 to 7, wherein the at least one processor is configured to determine the first resolution based on at least one of: at least one color of the content; a brightness of the content; a visual complexity of the content; movement of the content; or a classification of the content.

Aspect 9. The apparatus of any one of aspects 1 to 8, wherein the at least one processor is configured to determine a level of processing for the content-based ROI based on at least one of: at least one color of the content; a brightness of the content; a visual complexity of the content; movement of the content; or a classification of the content.

Aspect 10. The apparatus of any one of aspects 1 to 9, wherein the content comprises at least one of: a person; an object; a virtual object; or a virtual entity.

Aspect 11. The apparatus of any one of aspects 1 to 10, wherein the at least one processor is configured to: identify the content in the image data; determine, based on a plurality of factors, that the content satisfies a criterion; and responsive to determining that the content satisfies the criterion, determine the content-based ROI within the image data based on the content.

Aspect 12. The apparatus of aspect 11, wherein the at least one processor is configured to: determine a respective weight value for each factor of the plurality of factors; and determine a score for the plurality of factors based on the respective weight value determined for each factor of the plurality of factors; wherein, to determine that the content satisfies the criterion, the at least one processor is configured to determine that the score for the plurality of factors is greater than a score threshold.

Aspect 13. An apparatus for displaying images, the apparatus comprising: at least one memory; and at least one processor coupled to the at least one memory and configured to: obtain image data for display at a display of a head-mounted device (HMD), wherein the image data is based on at least one image captured by a scene-facing camera of the HMD; identify content in the image data; determine, based on a plurality of factors, that the content satisfies a criterion; responsive to determining that the content satisfies the criterion, determine a content-based region of interest (ROI) within the image data based on the content; display, at the display, ROI image data of the content-based ROI at a first resolution; and display, at the display, peripheral image data outside the content-based ROI at a second resolution, wherein the second resolution is lower than the first resolution.

Aspect 14. The apparatus of aspect 13, wherein the plurality of factors comprise at least two of: at least one color of the content; a brightness of the content; a visual complexity of the content; movement of the content; or a classification of the content.

Aspect 15. The apparatus of aspect 14, wherein the classification of the content comprises at least one of: an association between a user of the HMD and the content; or a label determined by a classifier.

Aspect 16. The apparatus of any one of aspects 14 or 15, wherein the content comprises a person and the classification of the content comprises a relationship between a user of the HMD and the person.

Aspect 17. The apparatus of any one of aspects 13 to 16, wherein the at least one processor is configured to: determine a respective weight value for each factor of the plurality of factors; and determine a score for the plurality of factors based on the respective weight value determined for each factor of the plurality of factors; wherein, to determine that the content satisfies the criterion, the at least one processor is configured to determine that the score for the plurality of factors is greater than a score threshold.

Aspect 18. The apparatus of any one of aspects 13 to 17, wherein the content comprises at least one of: a person; or an object.

Aspect 19. The apparatus of any one of aspects 13 to 18, wherein, to identify the content, the at least one processor is configured to at least one of: detect a person in the image data; or detect an object in the image data.

Aspect 20. A method for displaying images, the method comprising: obtaining image data for display at a display of a head-mounted device (HMD); determining a content-based region of interest (ROI) within the image data based on content of the image data; determining a gaze-based ROI of the image data based on gaze information; displaying, at the display, content-based-ROI image data of the content-based ROI at a first resolution; displaying, at the display, ROI image data of the ROI at a second resolution; and displaying, at the display, peripheral image data outside the content-based ROI and outside the ROI at a third resolution.

Aspect 21. The method of aspect 20, further comprising determining the gaze information based on an image of an eye of a user captured by a user-facing camera of the HMD.

Aspect 22. The method of any one of aspects 20 or 21, further comprising determining the first resolution based on a distance between the content-based ROI and the ROI.

Aspect 23. The method of any one of aspects 20 to 22, wherein the image data is based on an image captured by a scene-facing camera of the HMD.

Aspect 24. The method of any one of aspects 20 to 23, wherein the image data comprises virtual content to be displayed at the display of the HMD.

Aspect 25. The method of any one of aspects 20 to 24, further comprising determining a size of the content-based ROI based on at least one of: at least one color of the content; a brightness of the content; a visual complexity of the content; movement of the content; or a classification of the content.

Aspect 26. The method of aspect 25, wherein the classification of the content comprises at least one of: an association between a user of the HMD and the content; a label determined by a classifier; or an assigned label.

Aspect 27. The method of any one of aspects 20 to 26, further comprising determining the first resolution based on at least one of: at least one color of the content; a brightness of the content; a visual complexity of the content; movement of the content; or a classification of the content.

Aspect 28. The method of any one of aspects 20 to 27, further comprising determining a level of processing for the content-based ROI based on at least one of: at least one color of the content; a brightness of the content; a visual complexity of the content; movement of the content; or a classification of the content.

Aspect 29. The method of any one of aspects 20 to 28, wherein the content comprises at least one of: a person; an object; a virtual object; or a virtual entity.

Aspect 30. The method of any one of aspects 20 to 29, further comprising: identifying the content in the image data; determining, based on a plurality of factors, that the content satisfies a criterion; and responsive to determining that the content satisfies the criterion, determining the content-based ROI within the image data based on the content.

Aspect 31. The method of aspect 30, further comprising: determining a respective weight value for each factor of the plurality of factors; and determining a score for the plurality of factors based on the respective weight value determined for each factor of the plurality of factors; wherein determining that the content satisfies the criterion comprises determining that the score for the plurality of factors is greater than a score threshold.

Aspect 32. A method for displaying images, the method comprising: obtaining image data for display at a display of a head-mounted device (HMD), wherein the image data is based on at least one image captured by a scene-facing camera of the HMD; identifying content in the image data; determining, based on a plurality of factors, that the content satisfies a criterion; responsive to determining that the content satisfies the criterion, determining a content-based region of interest (ROI) within the image data based on the content; displaying, at the display, ROI image data of the content-based ROI at a first resolution; and displaying, at the display, peripheral image data outside the content-based ROI at a second resolution, wherein the second resolution is lower than the first resolution.

Aspect 33. The method of aspect 32, wherein the plurality of factors comprise at least two of: at least one color of the content; a brightness of the content; a visual complexity of the content; movement of the content; or a classification of the content.

Aspect 34. The method of aspect 33, wherein the classification of the content comprises at least one of: an association between a user of the HMD and the content; or a label determined by a classifier.

Aspect 35. The method of any one of aspects 32 to 34, wherein the content comprises a person and the classification of the content comprises a relationship between a user of the HMD and the person.

Aspect 36. The method of any one of aspects 32 to 35, further comprising: determining a respective weight value for each factor of the plurality of factors; and determining a score for the plurality of factors based on the respective weight value determined for each factor of the plurality of factors; wherein determining that the content satisfies the criterion comprises determining that the score for the plurality of factors is greater than a score threshold.

Aspect 37. The method of any one of aspects 32 to 36, wherein the content comprises at least one of: a person; or an object.

Aspect 38. The method of any one of aspects 32 to 37, wherein identifying the content comprises at least one of: detecting a person in the image data; or detecting an object in the image data.

Aspect 39. A non-transitory computer-readable storage medium having stored thereon instructions that, when executed by at least one processor, cause the at least one processor to perform operations according to any of aspects 20 to 38.

Aspect 40. An apparatus for providing virtual content for display, the apparatus comprising one or more means for perform operations according to any of aspects 20 to 38.

What is claimed is:

1. An apparatus for displaying images, the apparatus comprising:
   at least one memory; and
   at least one processor coupled to the at least one memory and configured to:
      obtain image data for display at a display of a head-mounted device (HMD);
      identify pixels of the image data that represent content in the image data;
      in response to determining that one or more characteristics of the pixels satisfy a threshold, determine a content-based region of interest (ROI) within the image data based on the pixels;
      determine a gaze-based ROI of the image data based on gaze information;
      display, at the display, content-based-ROI image data of the content-based ROI at a first resolution;
      display, at the display, gaze-based ROI image data of the gaze-based ROI at a second resolution; and
      display, at the display, peripheral image data outside the content-based ROI and outside the ROI at a third resolution.

2. The apparatus of claim 1, wherein the at least one processor is configured to determine the gaze information based on an image of an eye of a user captured by a user-facing camera of the HMD.

3. The apparatus of claim 1, wherein the at least one processor is configured to determine the first resolution based on a distance between the content-based ROI and the gaze-based ROI.

4. The apparatus of claim 1, wherein the image data is based on an image captured by a scene-facing camera of the HMD.

5. The apparatus of claim 1, wherein the image data comprises virtual content to be displayed at the display of the HMD.

6. The apparatus of claim 1, wherein, to determine that the one or more characteristics of the pixels satisfy the threshold, the at least one processor is configured to at least one of:
   compare at least one color of the pixels to a color threshold;
   compare a brightness of the pixels to a brightness threshold;
   compare a visual complexity of the pixels to a visual-complexity threshold; or
   compare movement of the content between the image data and prior image data to a movement threshold.

7. The apparatus of claim 1, wherein the at least one processor is configured to:

determine a classification of the content based on the image data; and in response to determining that the classification of the content satisfies a criterion, determine the content-based ROI within the image data based on the pixels;

wherein the classification of the content comprises at least one of:

an association between a user of the HMD and the content;

a label determined by a classifier; or an assigned label.

8. The apparatus of claim 1, wherein the at least one processor is configured to determine the first resolution based on at least one of:

at least one color of the pixels;

a brightness of the pixels;

a visual complexity of the pixels;

movement of the content; or a classification of the content.

9. The apparatus of claim 1, wherein the at least one processor is configured to determine a level of processing for the content-based ROI based on at least one of:

at least one color of the pixels;

a brightness of the pixels;

a visual complexity of the pixels;

movement of the content; or a classification of the content.

10. The apparatus of claim 1, wherein the content comprises at least one of:

a person;

an object;

a virtual object; or a virtual entity.

11. The apparatus of claim 1, wherein the at least one processor is configured to:

determine, based on a plurality of factors, that the content satisfies a criterion; and responsive to determining that the content satisfies the criterion, determine the content-based ROI within the image data based on the content.

12. The apparatus of claim 11, wherein the at least one processor is configured to:

determine a respective weight value for each factor of the plurality of factors; and determine a score for the plurality of factors based on the respective weight value determined for each factor of the plurality of factors;

wherein, to determine that the content satisfies the criterion, the at least one processor is configured to determine that the score for the plurality of factors is greater than a score threshold.

13. An apparatus for displaying images, the apparatus comprising:

at least one memory; and at least one processor coupled to the at least one memory and configured to:

obtain image data for display at a display of a head-mounted device (HMD), wherein the image data is based on at least one image captured by a scene-facing camera of the HMD;

identify pixels of the image data that represent content in the image data;

determine, based on a plurality of factors, that the content satisfies a criterion based on one or more characteristics of the pixels;

responsive to determining that the content satisfies the criterion, determine a content-based region of interest (ROI) within the image data based on the pixels;

display, at the display, ROI image data of the content-based ROI at a first resolution; and display, at the display, peripheral image data outside the content-based ROI at a second resolution, wherein the second resolution is lower than the first resolution.

14. The apparatus of claim 13, wherein the plurality of factors comprise at least two of:

at least one color of the pixels;

a brightness of the pixels;

a visual complexity of the pixels; or movement of the content between the image data and prior image data.

15. The apparatus of claim 13, wherein the at least one processor is configured to:

determine a classification of the content based on the image data, in response to determining that the classification of the content satisfies a criterion, determine the content-based ROI within the image data based on the pixels;

wherein the classification of the content comprises at least one of:

an association between a user of the HMD and the content; or a label determined by a classifier.

16. The apparatus of claim 15, wherein the content comprises a person and the classification of the content comprises a relationship between a user of the HMD and the person.

17. The apparatus of claim 13, wherein the at least one processor is configured to:

determine a respective weight value for each factor of the plurality of factors; and determine a score for the plurality of factors based on the respective weight value determined for each factor of the plurality of factors;

wherein, to determine that the content satisfies the criterion, the at least one processor is configured to determine that the score for the plurality of factors is greater than a score threshold.

18. The apparatus of claim 13, wherein the content comprises at least one of:

a person; or an object.

19. The apparatus of claim 13, wherein, to identify the content, the at least one processor is configured to at least one of:

detect a person in the image data; or detect an object in the image data.

20. A method for displaying images, the method comprising:

obtaining image data for display at a display of a head-mounted device (HMD);

identify pixels of the image data that represent content in the image data;

in response to determining that one or more characteristics of the pixels satisfy a threshold, determining a content-based region of interest (ROI) within the image data based on the pixels;

determining a gaze-based ROI of the image data based on gaze information;

displaying, at the display, content-based-ROI image data of the content-based ROI at a first resolution;

displaying, at the display, ROI image data of the ROI at a second resolution; and displaying, at the display, peripheral image data outside the content-based ROI and outside the ROI at a third resolution.

* * * * *